(12) United States Patent
Kino et al.

(10) Patent No.: US 7,264,267 B2
(45) Date of Patent: Sep. 4, 2007

(54) HEAD-PROTECTIVE AIRBAG DEVICE

(75) Inventors: Masao Kino, Aichi-ken (JP); Toshinori Tanase, Aichi-ken (JP); Tetsuya Ogata, Aichi-ken (JP); Yoshio Mizuno, Aichi-ken (JP); Toru Koyama, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 377 days.

(21) Appl. No.: 10/500,465

(22) PCT Filed: Mar. 5, 2003

(86) PCT No.: PCT/JP03/02538

§ 371 (c)(1),
(2), (4) Date: Jul. 13, 2004

(87) PCT Pub. No.: WO03/076236

PCT Pub. Date: Sep. 18, 2003

(65) Prior Publication Data

US 2005/0127644 A1    Jun. 16, 2005

(30) Foreign Application Priority Data

Mar. 8, 2002  (JP)  ............................. 2002-064090
Jan. 30, 2003  (JP)  ............................. 2003-022591

(51) Int. Cl.
B60R 21/16   (2006.01)
(52) U.S. Cl. ............................. 280/728.2; 280/730.2; 280/743.2
(58) Field of Classification Search ............ 280/730.2, 280/728.1, 728.2, 730.1, 733, 742, 743.1, 280/743.2
See application file for complete search history.

(56) References Cited

U.S. PATENT DOCUMENTS 5,480,181 A * 1/1996 Bark et al. ............... 280/730.2

(Continued)

FOREIGN PATENT DOCUMENTS

EP    1 069 007 A1    1/2001

(Continued)

OTHER PUBLICATIONS

Supplementary European search report dated Sep. 14, 2005.

Primary Examiner—Paul N. Dickson
Assistant Examiner—Karen J. Amores
(74) Attorney, Agent, or Firm—Posz Law Group, PLC

(57) ABSTRACT

The head-protecting airbag device (M1) includes an airbag (12) provided with a gas admissive portion (13) and a non-admissive portion (23). The gas admissive portion (13) includes a gas feed passage (14) for feeding inflation gas G toward both front and rearwards of the vehicle, and a plurality of vertical chambers (17) juxtaposed along front-rear direction of the vehicle. Each of the vertical chambers (17) includes a communication port at its upper end for communicating with the gas feed passage (14). The substantial lengths of a vehicle's outer wall (13b) and an inner wall (13a) of the airbag (12) are differentiated from each other by a belt (31) in the periphery (19) of the communication port (18). Thus the periphery (19) of the communication port (18) guides inflation gas (G) obliquely down and toward the vehicle's exterior (O) when inflation gas (G) flows into the vertical chamber (17) via the communication port. The head-protecting airbag device (M1) is made compact and improves workability in the mounting work on the vehicle while ensuring downward deployment of the airbag (12) along the window (W).

5 Claims, 39 Drawing Sheets

U.S. PATENT DOCUMENTS

| | | | |
|---|---|---|---|
| 6,135,493 A * | 10/2000 | Jost et al. | 280/730.2 |
| 6,149,185 A * | 11/2000 | White et al. | 280/728.2 |
| 6,170,860 B1 * | 1/2001 | Denz et al. | 280/730.2 |
| 6,176,515 B1 * | 1/2001 | Wallner et al. | 280/730.2 |
| 6,224,087 B1 | 5/2001 | Stütz et al. | |
| 6,224,091 B1 | 5/2001 | Eyrainer et al. | |
| 6,273,458 B1 * | 8/2001 | Steffens et al. | 280/730.2 |
| 6,293,581 B1 * | 9/2001 | Saita et al. | 280/730.2 |
| 6,338,498 B1 * | 1/2002 | Niederman et al. | 280/728.2 |
| 6,375,214 B1 * | 4/2002 | Nishikaji | 280/728.2 |
| 6,460,877 B2 * | 10/2002 | Tanabe et al. | 280/729 |
| 6,481,743 B1 * | 11/2002 | Tobe et al. | 280/728.2 |
| 6,517,104 B1 * | 2/2003 | Patel | 280/730.2 |
| 6,520,534 B2 * | 2/2003 | Ritter | 280/730.2 |
| 6,565,117 B2 * | 5/2003 | Kubota et al. | 280/730.2 |
| 6,575,496 B2 * | 6/2003 | Hess et al. | 280/730.2 |
| 6,655,713 B2 * | 12/2003 | Tanase et al. | 280/743.1 |
| 6,695,347 B2 * | 2/2004 | Sonnenberg et al. | 280/743.2 |
| 6,811,184 B2 * | 11/2004 | Ikeda et al. | 280/742 |
| 6,830,262 B2 * | 12/2004 | Sonnenberg et al. | 280/730.2 |
| 7,077,425 B2 * | 7/2006 | Ogawa et al. | 280/730.2 |
| 7,121,580 B2 * | 10/2006 | Sato et al. | 280/730.2 |
| 7,159,896 B2 * | 1/2007 | Ochiai et al. | 280/730.2 |
| 7,185,914 B2 * | 3/2007 | Recker et al. | 280/730.2 |
| 2001/0040360 A1 * | 11/2001 | Ishiyama et al. | 280/728.2 |
| 2001/0052692 A1 * | 12/2001 | Buerkle et al. | 280/730.2 |
| 2002/0000713 A1 * | 1/2002 | Tanase et al. | 280/730.2 |
| 2002/0024203 A1 | 2/2002 | Takahashi | |
| 2005/0127644 A1 * | 6/2005 | Kino et al. | 280/730.2 |
| 2005/0206138 A1 * | 9/2005 | Breuninger et al. | 280/729 |
| 2006/0066079 A1 * | 3/2006 | Inoue et al. | 280/730.2 |
| 2006/0138748 A1 * | 6/2006 | Kino et al. | 280/728.1 |
| 2006/0138756 A1 * | 6/2006 | Ochiai et al. | 280/730.2 |
| 2006/0157958 A1 * | 7/2006 | Heudorfer et al. | 280/730.2 |
| 2006/0170199 A1 * | 8/2006 | Sundararajan et al. | 280/733 |
| 2006/0184300 A1 * | 8/2006 | Schubert et al. | 701/45 |
| 2006/0202452 A1 * | 9/2006 | Breed et al. | 280/730.2 |
| 2006/0214401 A1 * | 9/2006 | Hirata | 280/730.1 |
| 2006/0220358 A1 * | 10/2006 | Umehara | 280/730.2 |
| 2007/0001433 A1 * | 1/2007 | Gu et al. | 280/729 |

FOREIGN PATENT DOCUMENTS

| | | |
|---|---|---|
| JP | A-H09-249089 | 9/1997 |
| JP | A-2000-62562 | 2/2000 |
| JP | A-2001-39257 | 2/2001 |
| JP | A-2001-80446 | 3/2001 |
| JP | A-2001-354102 | 12/2001 |
| JP | A-2002-29360 | 1/2002 |
| JP | A-2002-046567 | 2/2002 |

* cited by examiner

Fig. 5
A.
B.
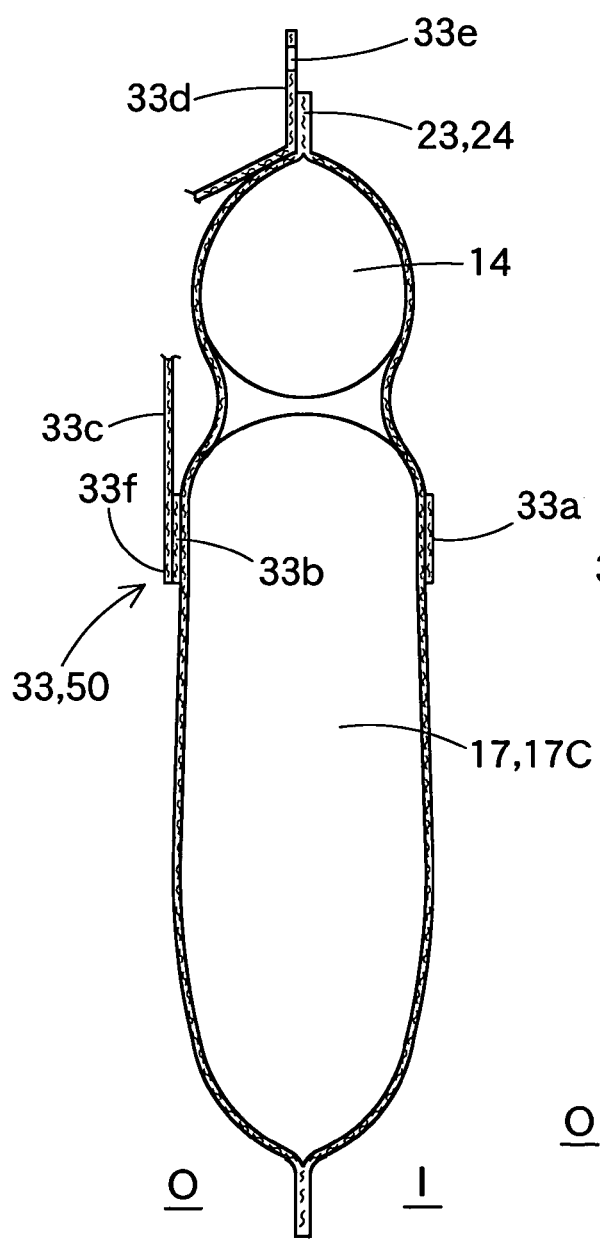
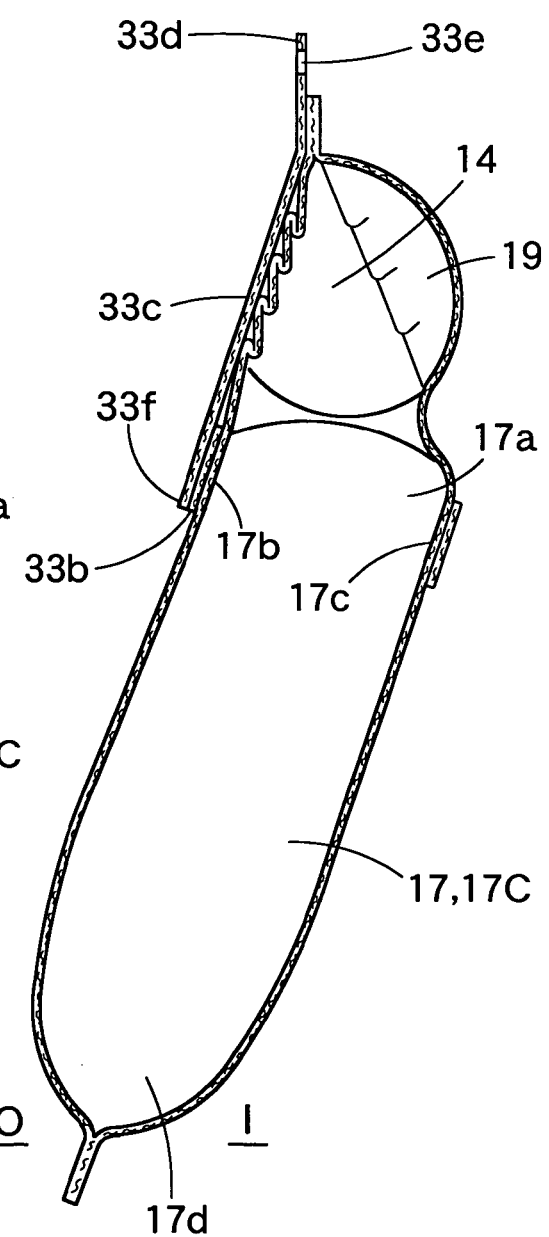

HEAD-PROTECTIVE AIRBAG DEVICE

TECHNICAL FIELD

The present invention relates to a head-protecting airbag device including an airbag which is folded and housed in the upper edge of windows in the interior of vehicle, and deployable downward along the windows upon inflow of inflation gas.

BACKGROUND ART

In the prior art, Japanese Patent Laid-Open No. 9-249089, for example, discloses a head-protecting airbag device which includes a vertically extended sliding rail in a pillar portion for smoothing airbag deployment along windows. The airbag device includes an airbag provided with a guide member to be connected to the sliding rail.

With this arrangement, however, the airbag device cannot be constructed compactly because the airbag device requires a vertically elongate sliding rail to be located in the pillar portion while the folded airbag itself is housed in the upper edge of windows. In addition, when the airbag device is mounted on a vehicle, as the sliding rail is attached to the pillar portion, the folded airbag has to be mounted on the vehicle with the guide member connected to the sliding rail. This and an extensive working area required in the mounting work conjointly complicate the mounting work.

Moreover, the pillar portion is usually provided with a pillar garnish on the vehicle's interior side. When the sliding rail is covered with the pillar garnish in consideration of appearance, the garnish needs to include an opening such that the guide member may smoothly slide in the sliding rail. In other words, with the above arrangement, the pillar garnish must be changed to one in which an opening can be formed.

DISCLOSURE OF INVENTION

The present invention contemplates to solve the above problems, and therefore, has an object to provide a head-protecting airbag device which is constructed compactly and improves mounting work on a vehicle, while securing smooth downward airbag deployment along windows.

The head-protecting airbag device according to the present invention includes an airbag which is folded and housed in the upper edge of windows inside a vehicle, and is deployable downward along the windows when fed with inflation gas. The airbag includes: a gas admissive portion which is inflatable with inflation gas by separating a vehicle's inner wall and an outer wall of the airbag; and a non-admissive portion which is formed by joining the vehicle's inner wall and outer wall and admits no inflation gas. The gas admissive portion includes: a gas feed passage extending along the upper edge of the airbag as flatly expanded for feeding inflation gas toward front and rear directions; and a plurality of vertical chambers juxtaposed along the front-rear direction of the vehicle. Each of the vertical chambers is provided at its upper end with a communication port for communicating with the gas feed passage. There is a gas flow regulating means in at least one of the vertical chambers by which, when inflation gas flows into the vertical chamber via the communication port, the inflation gas is directed obliquely down and toward the vehicle's exterior.

When inflation gas is fed into the airbag after the head-protecting airbag device of the present invention is mounted on the vehicle, inflation gas flows through the gas feed passage along the front-rear direction, and then is supplied to the plurality of juxtaposed vertical chambers via each of the communication ports. Then the air bag expands downward from the upper edge of windows inside the vehicle, and completes inflation.

At this time, since the airbag device of the present invention is provided with a gas flow regulating means in at least one of the vertical chambers, inflation gas flows into the vertical chamber via the communication port while being directed down and toward the vehicle's exterior. Accordingly, the vertical chamber expands downward along the window, and thus the entire airbag expands along the window, and then completes inflation.

This gas flow regulating means has only to be located proximate to the vertical chamber in a housed state so as to regulate the flow of the gas flowing into the vertical chamber via the communication port. This dispenses with a member which was conventionally located in a pillar portion. Therefore, the airbag device is made compact and improves workability in the mounting work on the vehicle.

Therefore, the head-protecting airbag device of the present invention is made compact and improves workability in the mounting work on the vehicle while ensuring airbag deployment along the window.

The gas flow regulating means may also be constituted by differentiating the lengths of the periphery of at least one communication port in the gas feed passage of the airbag. More specifically, in the periphery of at least one communication port, substantial lengths of the vehicle's inner wall and outer wall in the gas feed passage of the airbag are differentiated from each other such that inflation gas is directed obliquely down and toward the vehicle's exterior when flowing into the vertical chamber via the communication port.

With this arrangement, airbag deployment along the window is ensured merely by differentiating the substantial lengths of the vehicle's outer wall and inner wall of the airbag in the periphery of at least one communication port in the gas feed passage. As an arrangement to differentiate the substantial lengths of the vehicle's outer wall and inner wall, a flexible belt is attached to the airbag such that tucks are formed in the vehicle's inner wall, for example. That is, the arrangement is constructed by the airbag itself. This dispenses with a separate member conventionally located in a pillar portion, so that the airbag device is made compact. In addition, the mounting work of the airbag is facilitated since the airbag deployable along the windows can be mounted on the vehicle by folding and housing the airbag in the upper edge of the windows together with the aforementioned belt.

The length adjusting means to differentiate the substantial lengths of the vehicle's outer wall and inner wall in the periphery of at least one communication port in the gas feed passage of the airbag may be constituted by a patch member, other than the aforementioned belt for forming tucks, provided that it does not hinder the folding work of the airbag and can be mounted on the vehicle together with the airbag. This patch member is formed by flexible reinforced fabric for preventing gas leakage, for example. The patch member made of reinforced fabric is adhered either to the outer surface or the inner surface of the vehicle's inner wall. When the airbag inflates, with this arrangement, the portion in the vehicle's inner wall to which the patch member is adhered stretches less than the vehicle's outer wall. It will also be appreciated to form the length adjusting means by changing the weaving density in the vehicle's inner wall and outer wall. For example, the number of warps and wefts is changed in weaving the vehicle's inner wall and outer wall. More specifically, more warps and wefts are used to form the vehicle's inner wall than in forming the vehicle's outer wall, so that the inner wall is denser than the outer wall. In this case, upon airbag deployment, the vehicle's inner wall stretches less than the outer wall.

The gas flow regulating member may also be constituted by a belt having flexibility. This belt is located in the airbag side toward the vehicle's exterior and joined to the vicinity of at least one vertical chamber and to the vehicle body near the housing position of the airbag. This belt helps presses the inflating vertical chamber toward the window.

With this arrangement, airbag deployment along windows is ensured by merely locating a flexible belt that is joined to the vicinity of at least one vertical chamber and to the vehicle body in the vicinity of the housing position of the airbag in the vehicle's exterior side of the airbag. Since a separate member conventionally located in a pillar portion is not required, the airbag device can be made compact. Moreover, this belt has flexibility, and is joined to the vehicle body in the vicinity of the housing position of the airbag and to the airbag. Accordingly, if the airbag is folded up together with the belt that is joined with the airbag, and is housed in the upper edge of windows with the belt joined also to the vehicle body, the airbag that is deployable along windows is easily mounted on the vehicle, so that the mounting work on the vehicle is facilitated.

It will also be appreciated to locate auxiliary chambers as the gas flow regulating means above the gas feed passage in the gas admissive portion of the airbag completely inflated. This auxiliary chamber inflates between a panel as part of the vehicle body and an airbag cover in the vicinity of the housing position of the airbag. The airbag cover openably covers an airbag side toward the vehicle's interior.

In the airbag having the auxiliary chamber, when the auxiliary chamber inflates together with the gas feed passage in the initial stage of airbag inflation, the gas feed passage and the auxiliary chamber are pushed by the airbag cover, and the auxiliary chamber comes to abut against the panel of the vehicle body. At this time, since the panel of the vehicle body is slanted toward the vehicle's exterior as it goes down, the auxiliary chamber supported by the panel of the vehicle body direct its lower part toward the exterior. Then inflation gas flowing into the vertical chamber via the communication port from the gas feed passage is directed down and toward the exterior. As a result, the vertical chamber is pressed toward the window while inflating. This arrangement dispenses with a separate member conventionally located in a pillar portion by merely locating the auxiliary chamber in the gas admissive portion of the airbag. Therefore, the airbag device is made compact, and workability is improved in the mounting work on a vehicle.

It is desirable to locate one auxiliary chamber respectively above predetermined numbers of the vertical chambers. With this arrangement, each of the predetermined numbers of the vertical chambers has one auxiliary chamber thereabove. Accordingly, all those vertical chambers are able to inflate along windows, so that the entire airbag stably deploys along windows.

In this case, it is desirable that the dimension of each of the auxiliary chambers in the front-rear direction and the opening dimension of the communication port below the auxiliary chamber in the front-rear direction are equal to each other. In the initial stage of airbag inflation, with this arrangement, each of the auxiliary chambers and an upper part of the vertical chamber cooperatively inflate in a vertically elongate rod-shape having rigidity. Therefore, the vertical chambers further stably deploy along the windows.

When the auxiliary chambers are provided, it is desirable to locate mounting portions for attaching the airbag to the panel of the vehicle body, below the upper ends of the auxiliary chambers and above the vertical chambers as the airbag is completely inflated. With this arrangement, when each of the auxiliary chambers is inflated and supported by the panel of the vehicle body, the inflating vertical chamber below the auxiliary chamber is pressed toward the window like a lever in which the mounting portions serve as fulcrum. That is, the vertical chambers are able to deploy along the windows stably whether or not the airbag cover presses the gas feed passage and the auxiliary chambers.

When the auxiliary chambers are provided, it will also be appreciated to locate a secondary chamber in the airbag that is inflatable below the gas feed passage as the airbag is completely inflated and is not communicated with the gas feed passage at its upper end. In both front and rear of the secondary chamber are located the vertical chambers having the auxiliary chambers thereabouts. Moreover, the secondary chamber is communicated with lower part of at least one of the front and rear vertical chambers, which serves as an inlet port for in letting inflation gas in the secondary chamber. With this arrangement, the secondary chamber is able to complete downward expansion in a thin condition before admitting inflation gas by the vertical chambers located left and right hand sides thereof, and then inflate admitting inflation gas from the inlet port. Accordingly, the secondary chamber of the airbag is able to cover the vehicle's inner side of a pillar portion smoothly even in the pillar portion with a narrow space between occupants and windows.

It will also be appreciated to locate a joining inflatable portion in the gas admissive portion of the airbag for constituting the gas flow regulating means. This joining inflatable portion is located vertically between the gas feed passage and the vertical chambers upon airbag deployment, and inflates between the panel of vehicle body and the airbag cover for openably covering an airbag side toward the vehicle's interior, in the vicinity of the housing for the airbag.

In this airbag, the joining inflatable portion located below the gas feed passage carries out the function of the aforementioned auxiliary chambers. More specifically, if the joining inflatable portion inflates together with the gas feed passage in the initial stage of airbag inflation, the gas feed passage and the joining inflatable portion are pushed by the airbag cover, and the joining inflatable portion comes to abut against and supported by the panel of vehicle body. At this time, since the panel is slanted toward the vehicle's exterior as it goes down, the joining inflatable portion supported by the panel directs its lower part toward the vehicle's exterior. Then inflation gas flows into the vertical chambers via the communication ports from the gas feed passage while being directed down and toward the vehicle's exterior. As a result, the vertical chambers are pressed toward the windows while inflating. This arrangement dispenses with a separate member conventionally located in a pillar portion by merely locating the joining inflatable portion in the gas admissive portion of the airbag. Therefore, the airbag device is made compact, and workability is improved in mounting on the vehicle.

It will also be appreciated to constitute the gas flow regulating means by a holder that is located proximate to the housing position of the airbag for holding and fixing a periphery of the communication port of at least one of the vertical chambers upon airbag deployment.

In this airbag device, the holder is able to securely regulate the direction of inflation gas flowing into the vertical chamber down and toward the vehicle's exterior by holding the periphery of the communication port, so that the vertical chamber is able to deploy along the windows. The holder has only to be located proximate to the communication port of the housed vertical chamber, unlike a vertically elongate predetermined member conventionally located in a pillar portion. Therefore, the airbag device is made compact, and the workability is improved in mounting the airbag device on the vehicle.

It will also be appreciated to constitute the gas flow regulating member by a part of the airbag cover for openably covering an airbag side toward the vehicle's interior in the vicinity of the housing position of the airbag. This part of the airbag cover is configured to be suppressed from opening toward the vehicle's interior than remaining part of the airbag cover such that at least one of the vertical chambers deploys while being pressed toward the vehicle's exterior.

In this airbag device, upon airbag deployment, a predetermined part of the airbag cover presses the vertical chamber toward the vehicle's exterior compared with remaining part of the airbag. Accordingly, the communication port of the vertical chamber is directed down and toward the vehicle's exterior, and thus the vertical chamber deploys along the window. This arrangement can be made easily by merely enhancing the rigidity of a part of the airbag cover, without changing the construction of the airbag itself. That is, the airbag device dispenses with a separate member which was conventionally located in a pillar portion, and thus is constructed compactly. In addition, the airbag device is constructed easily by merely changing the design of the airbag cover, which has been a conventional part of the airbag device, so that the airbag device does not increase the number of parts mounted on the vehicle. Accordingly, the workability is improved in mounting the airbag device on vehicle. With this arrangement, of course, it is prevented to the utmost that deployment of the entire airbag is delayed, since the airbag cover is not rigidified entirely.

BRIEF DESCRIPTION OF DRAWINGS

FIG. 4A illustrates an inflated condition of the airbag not regulated by a belt, while FIG. 4B illustrates an inflated condition of the airbag being regulated by the belt;

FIG. 5 are schematic enlarged sections taken along line V-V in FIG. 3 as the airbag is inflated, and FIG. 5A illustrates an inflated condition of the airbag not regulated by a belt, while FIG. 5B illustrates an inflated condition of the airbag being regulated by the belt;

FIG. 14A illustrates an inflated condition of the airbag not regulated by a belt, while FIG. 14B illustrates an inflated condition of the airbag being regulated by the belt;

FIG. 15A illustrates an inflated condition of the airbag not regulated by a belt, while FIG. 15B illustrates an inflated condition of the airbag being regulated by the belt;

DESCRIPTION OF THE PREFERRED EMBODIMENTS

Preferred embodiments of the present invention are described below with reference to the accompanying drawings.

Figure 1:
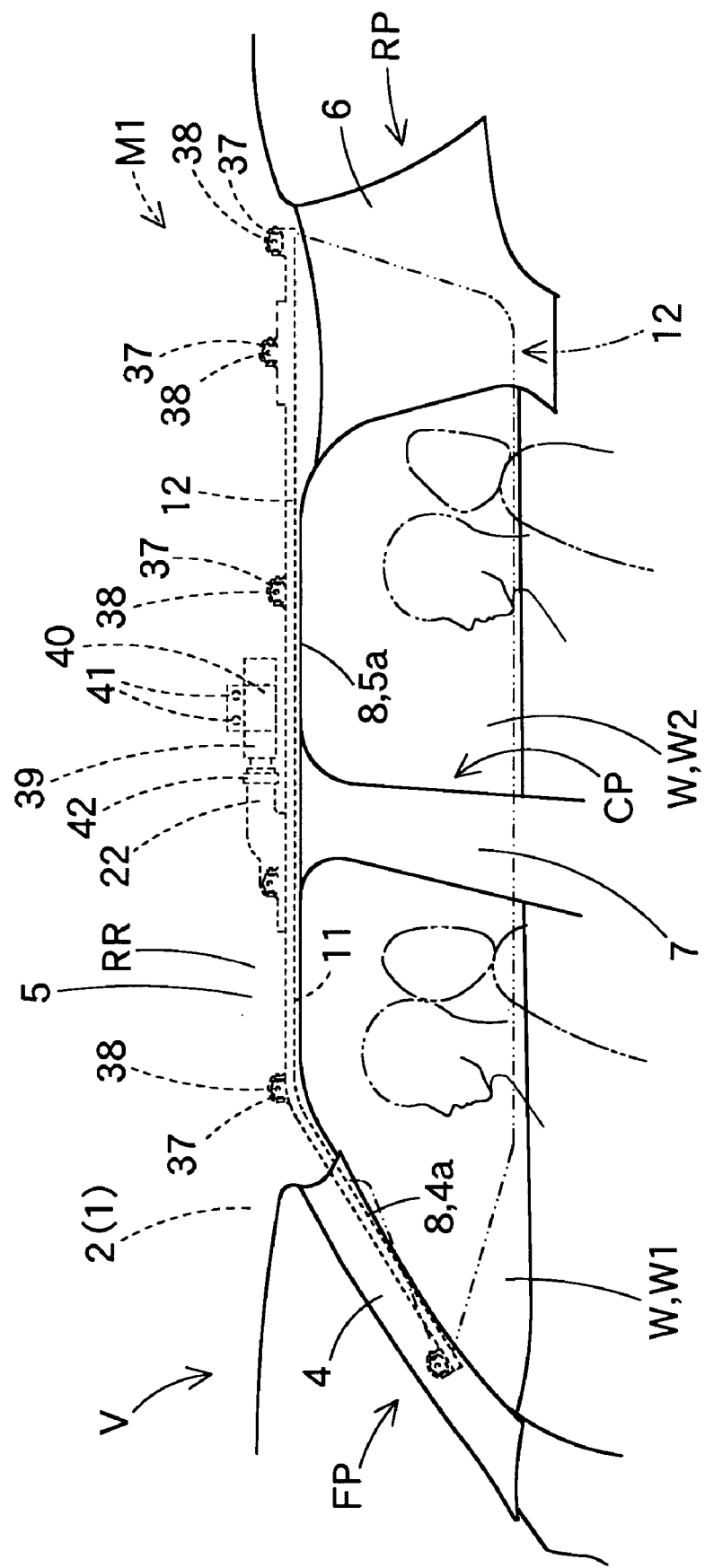
FIG. 1 is a schematic front view of a first embodiment of the head-protecting airbag device according to the present invention in action, as viewed from the interior of vehicle.
Figure 2:
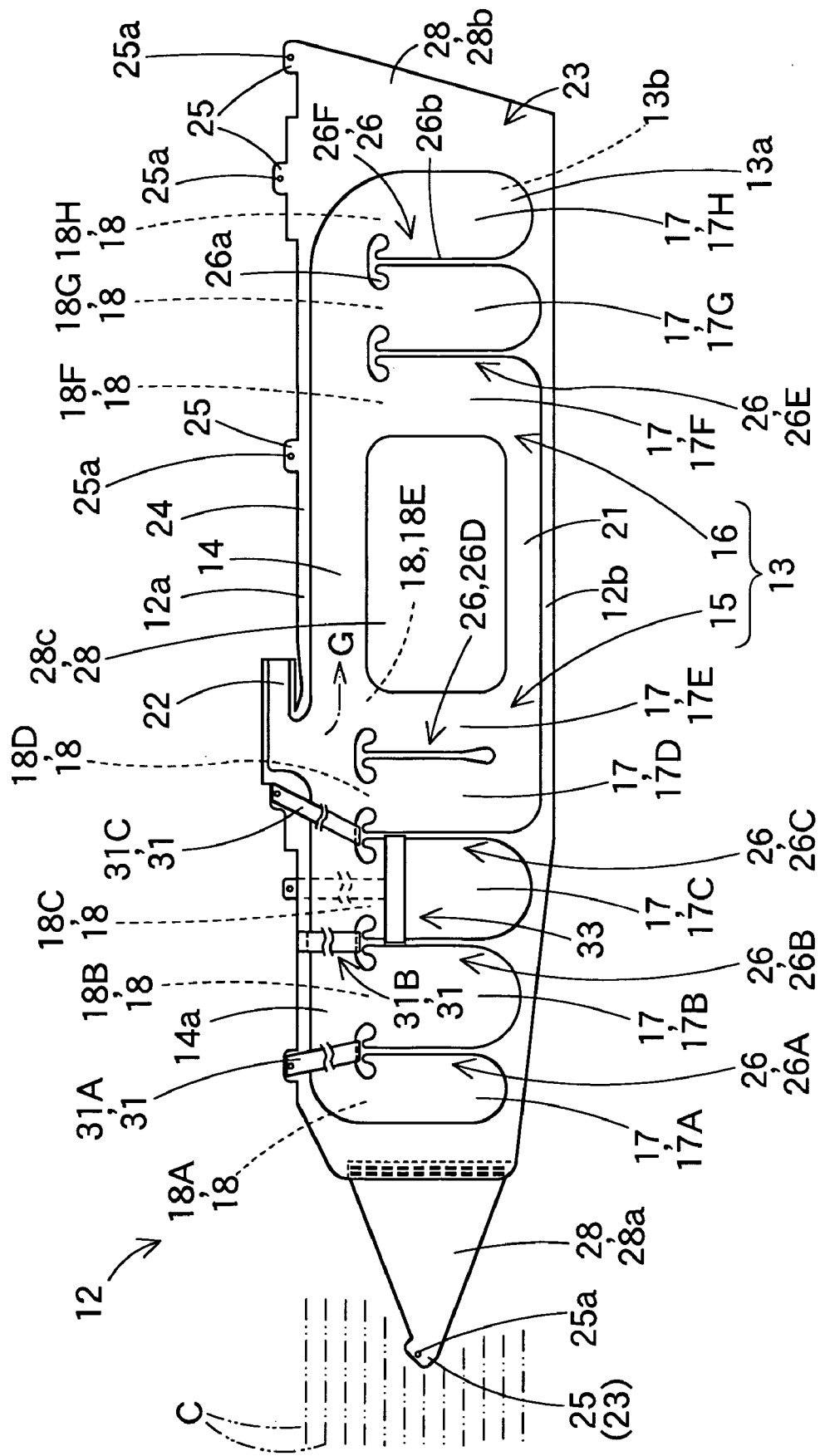
FIG. 2 is a front view of an airbag used in the first embodiment as flatly expanded.
Figure 10:
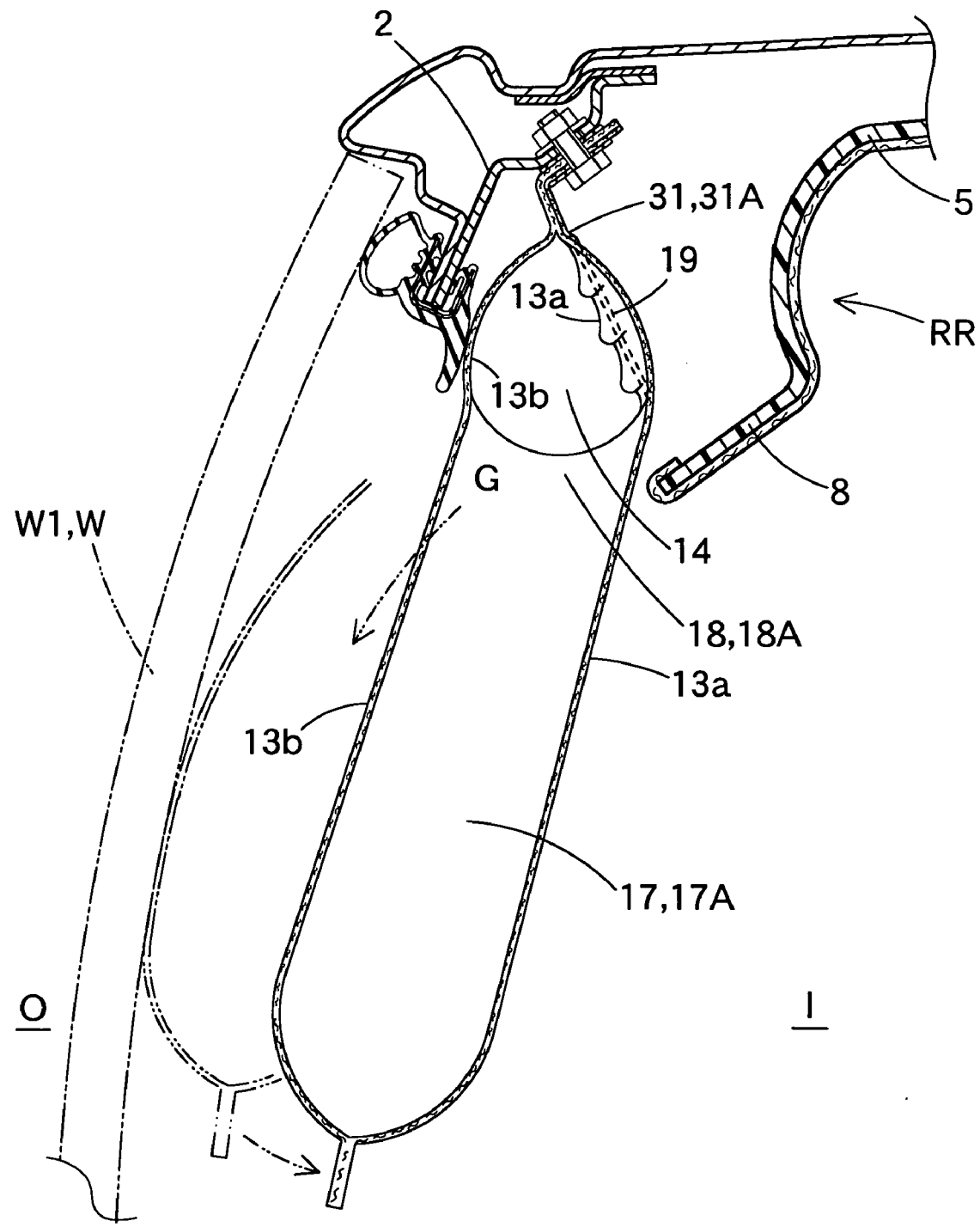
FIG. 10 is an enlarged section of the airbag of FIG. 2 in a completely inflated condition following the condition of FIG. 9.

Referring to FIGS. 1 and 2, a first embodiment of the head-protecting airbag device, as will be called a head-protecting airbag device M1, includes an airbag 12, an inflator 39, mounting brackets 37 and 40, an airbag cover 8, and a length adjuster 31 and a suspender belt 33 both of which serve as a gas flow regulating means 50. The airbag 12 is folded and housed in the upper edge of windows W (W1 and W2) inside a vehicle V, in a range from a lower edge of a front pillar FP to the upper side of a rear pillar RP, via a lower edge of a roof side rail RR. Here, as referred to FIGS. 10 and 12, the windows W1 and W2 are configured to protrude toward the vehicle's exterior O as they go down from the roof side rail RR or the upper side.

Referring to FIG. 1, the inflator 39 is of a cylinder type having a substantially cylindrical shape, and is joined with the airbag 12 by a cramp 42 while being sheathed with a later-described joint port 22 of the airbag 12. The inflator 39 is secured to an inner panel 2 with the bracket 40 in the roof side rail RR near the upper side of the center pillar CP, while being covered by the lower edge 5a of a roof head lining 5. The inner panel 2 is a member of a body 1 of the vehicle V. The mounting bracket 40 is made of sheet metal, and is adapted to hold the inflator 39 and be secured to the inner panel 2 by mounting bolts 41.

Figure 7:
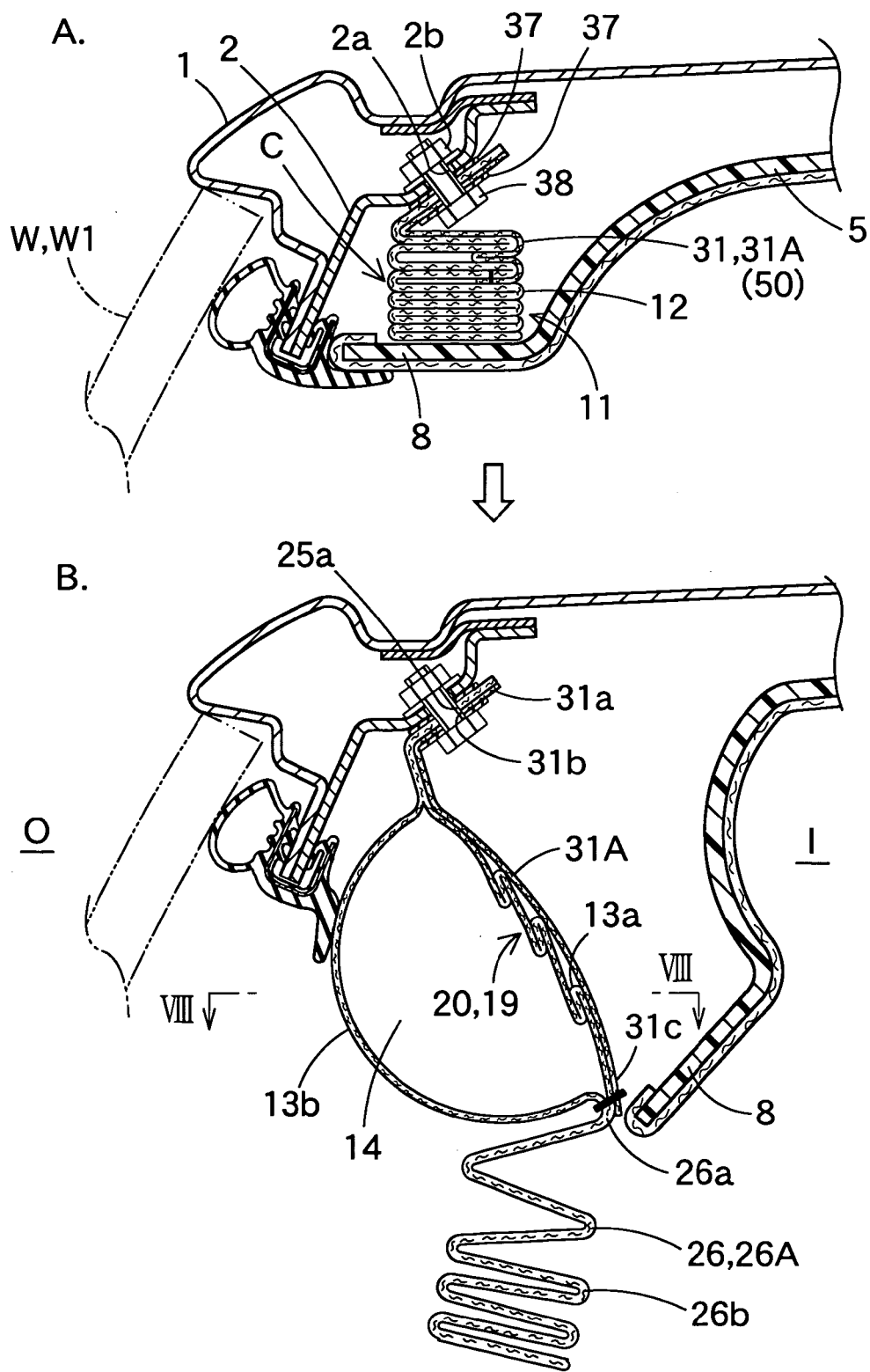
FIG. 7 are partial enlarged vertical sections illustrating an inflation process of the airbag of FIG. 2, taken along line VII-VII in FIG. 3.

Referring to FIG. 7, each of the mounting brackets 37 is formed of two sheet-metal plates, and is attached to a later-described mounting portion 25 of the airbag 12 in a manner to put the mounting portion 25 between the two plates, and secures the mounting portion 25 to the inner panel 2 with a mounting bolt 38. Individual mounting bolts 38 are fastened into mounting holes 2a formed in the inner panel 2 each with a nut 2b.

The airbag cover 8 is formed of lower edges 4a and 5a of each of a pillar garnish 4 arranged on the front pillar FP and a roof head lining 5 arranged on the roof side rail RR. The front pillar garnish 4 and the roof head lining 5 are made from synthetic resin, and are secured to the vehicle's inner side of the inner panel 2 of the vehicle body 1 in the front pillar FP and the roof side rail RR, respectively. The roof head lining 5 is arranged from upper side of the front pillar FP to upper side of the rear pillar RP, via upper side of the center pillar CP.

The airbag 12 is made by hollow-weaving method utilizing polyamide yarns or the like. As shown in FIGS. 1 to 6, the airbag 12 expands from folded state by admitting inflation gas G from the inflator 39, and deploys to cover the windows W (W1 and W2) and pillar garnishes 7 and 6 each of the center pillar CP and the rear pillar RP inside the vehicle. The airbag 12 includes a gas admissive portion 13 which inflates to separate its vehicle's inner wall 13a and vehicle's outer wall 13b upon inflow of inflation gas G, and a non-admissive portion 23 which admits no inflation gas G. The non-admissive portion 23 is formed by joining the vehicle's inner wall 13a and outer wall 13b.

In the foregoing embodiment, the gas admissive portion 13 includes a gas feed passage 14, a front admissive portion 15, a rear admissive portion 16, and a communication passage 21. The gas feed passage 14 is disposed straightly near the upper edge 12a of the airbag 12, along the front-rear direction of the vehicle V. In a substantially middle position in the front-rear direction of the gas feed passage 14 is formed a joint port 22 extending upward for allowing inflation gas G from the inflator 39 to flow into the gas admissive portion 13. When inflation gas flows into the gas feed passage 14 from the joint port 22, inflation gas G flows both front and rearwards of the vehicle V.

The front admissive portion 15 is located below and in front part of the gas feed passage 14, and inflates to cover the window W1 located at the side of a front seat of the vehicle V upon deployment of the airbag 12. The rear admissive portion 16 is located below and in rear part of the gas feed passage 14, and inflates to cover the window W2 located at the side of a rear seat of the vehicle V upon deployment of the airbag 12. The communication passage 21 is disposed near the lower edge 12b of the airbag 12 below a later-described panel portion 28 (rectangular panel portion 28c) in the front-rear direction along the lower edge 12b, and communicates lower rear end part of the front admissive portion 15 and lower front end part of the rear admissive portion 16.

Each of the front admissive portion 15 and the rear admissive portion 16 is partitioned by later-described partitioning portion 26, and includes a plurality of vertical chambers 17 juxtaposed along front-rear direction of the vehicle and each of which inflates in a vertical rod shape. In each of upper ends of the vertical chambers 17 (17A, 17B, 17C, 17D, 17E, 17F, 17G and 17H) is opened a communication port 18 (18A, 18B, 18C, 18D, 18E, 18F, 18G and 18H) communicating with the gas feed passage 14. Five vertical chambers 17A, 17B, 17C, 17D and 17E are juxtaposed within the front admissive portion 15, and three vertical chambers 17F, 17G and 17H are juxtaposed within the rear admissive portion 16.

The non-admissive portion 23 includes a peripheral portion 24, a plurality of mounting portions 25, a plurality of partitioning portions 26 and a panel portion 28. The peripheral portion 24 is located to encircle the gas admissive portion 13.

The mounting portions 25 are formed, in the illustrated embodiment, at six positions in the peripheral portion 24 and the panel portion 28 (triangular panel portions 28a and 28b) in the upper edge 12a of the airbag 12, and are projected upward therefrom. As shown in FIG. 7, each of the mounting portions 25 is provided with a mounting hole 25a for inserting a mounting bolt 38 therethrough, and a mounting bracket 37 is attached thereto for attachment of the airbag 12 to the inner panel 2.

The panel portion 28 includes triangular panel portions 28a and 28b each located at front and rear ends of the airbag 12, and a rectangular panel portion 28c disposed in an area defined by the front admissive portion 15, the rear admissive portion 16, the gas feed passage 14 and the communication passage 21. The panel portion 28 is provided to secure an entire shape of the airbag 12, and to help shorten a time for completing inflation by reducing the capacity of the gas admissive portion 13. The triangular panel portion 28a in the front side is projected forward from the front edge of the peripheral portion 24, and the triangular panel portion 28b in the rear side is projected rearward from the rear edge of the peripheral portion 24. In the illustrated embodiment, the triangular panel portion 28a is sewn and joined to the front end of the front admissive portion 15.

Figure 3:
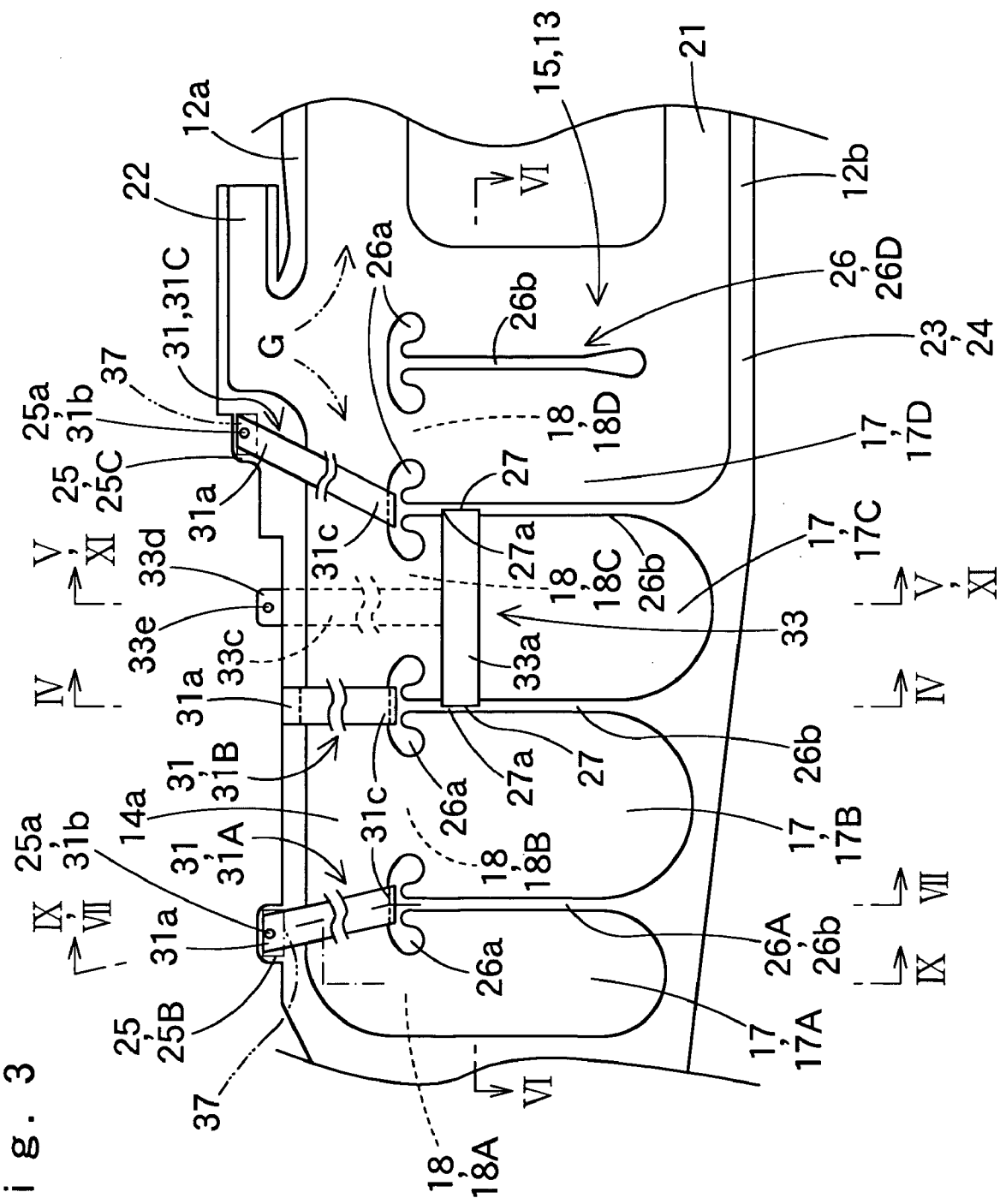
FIG. 3 is a partial enlarged front view of the airbag of FIG. 2 as flatly expanded.
Figure 4:
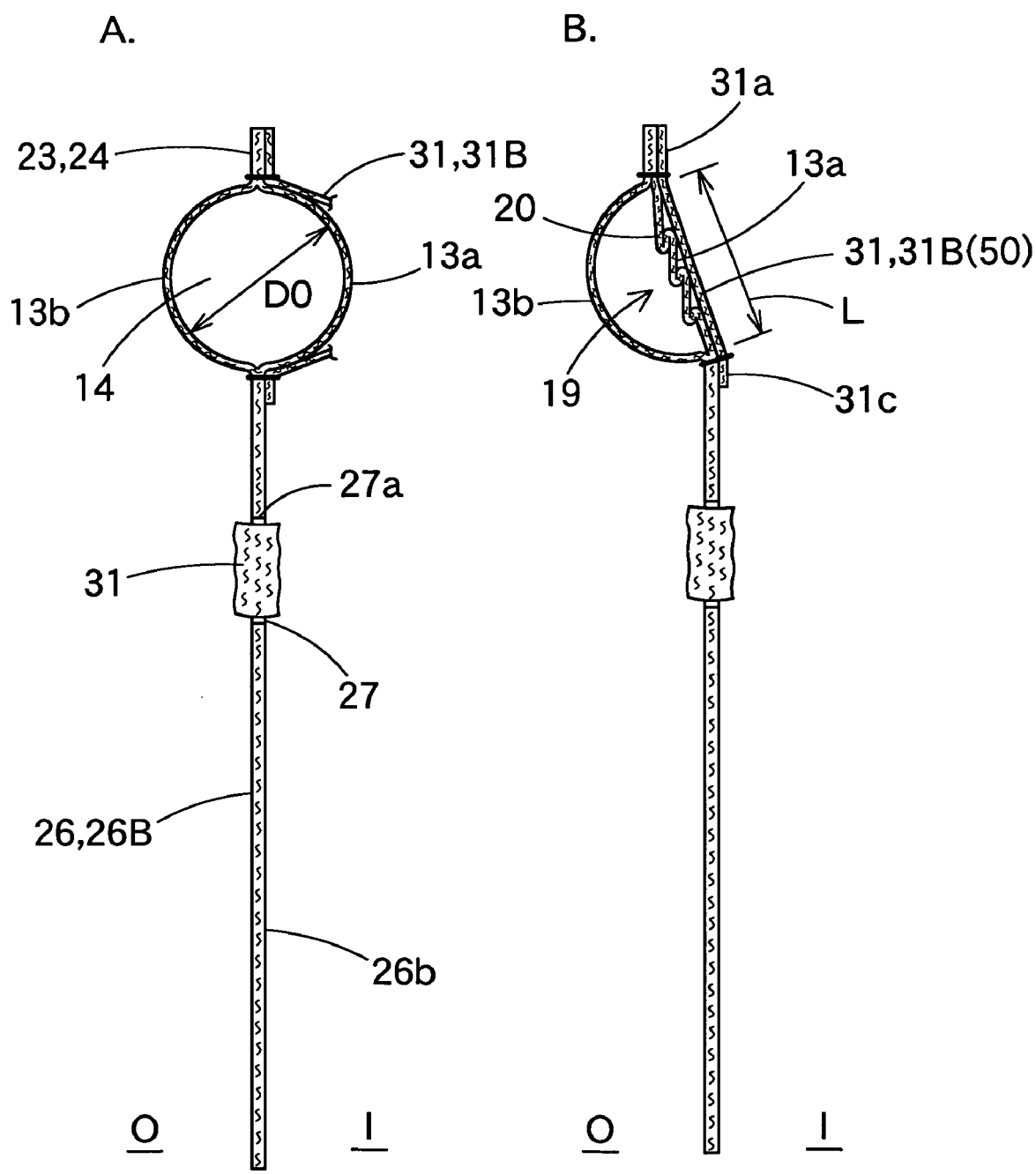
FIG. 4 are schematic enlarged sections taken along line IV-IV in FIG. 3 as the airbag is inflated.
Figure 6:
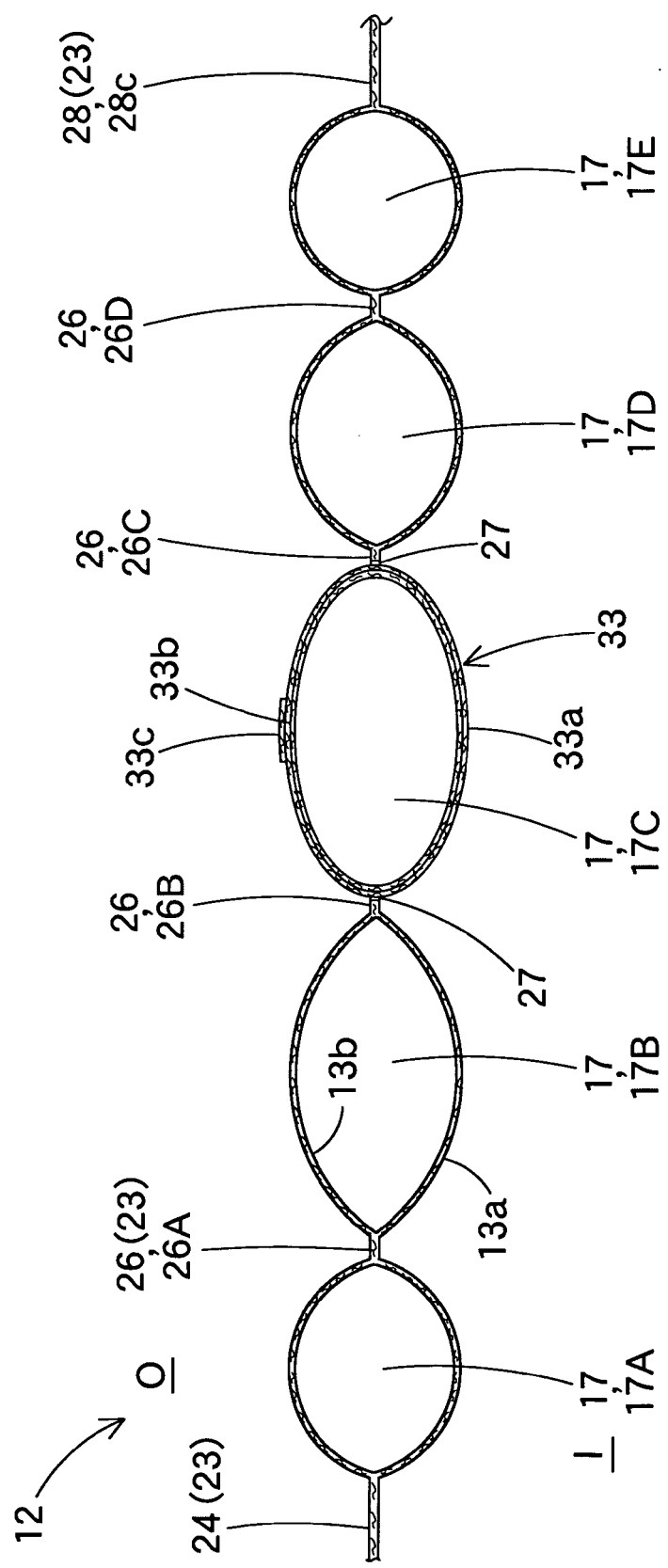
FIG. 6 is a schematic enlarged section taken along line VI-VI of FIG. 3 as the airbag is inflated.

Referring to FIGS. 2 and 3, the partitioning portions 26 are located in the area of each of the front and rear admissive portions 15 and 16. Each of the partitioning portions 26 is formed into a substantially T shape as viewed from vehicle's interior, and includes a horizontal portion 26a and a vertical portion 26b extending downward from the center of the horizontal portion 26a. These partitioning portions 26 (26A, 26B, 26C, 26D, 26E and 26F) are adapted to help the airbag 12 to inflate in a plate shape by regulating the thickness of the airbag 12. Upon deployment of the airbag 12, the individual vertical chambers 17 partitioned by the partitioning portions 26 shorten their lengths in the front-rear direction of the airbag 12 such that a tension in the front-rear direction is exerted in the lower edge 12b of the airbag 12.

The three partitioning portions 26A, 26B and 26C in the front side and two partitioning portions 26E and 26F in the rear side are extending upward from the peripheral portion 24 in the lower edge 12b of the airbag 12. On the other hand, the partitioning portion 26D in front of the rectangular panel portion 28c is away from the peripheral portion 24. In upper end part of the vertical portion 26b of each of the partitioning portions 26B and 26C is formed a vertical slit 27 through the vehicle's exterior O and interior I of the airbag 12.

The length adjuster 31 is adapted to differentiate substantial lengths of the vehicle's outer wall 13b and inner wall 13a in the gas feed passage 14. As referred to FIGS. 2 and 3, the length adjuster 31 is located at three positions in the vehicle's inner side I of the airbag 12. The length adjuster 31A located front most has its upper end 31a fastened to the vehicle's inner side I of the mounting portion 25 (25B) by the bracket 37 above the vertical chamber 17A, while having its lower end 31c extended obliquely down and rearward from the upper end 31a, and sewn and joined to the vehicle's inner side I of the horizontal portion 26a of the front most partitioning portion 26A. The length adjuster 31C located rearmost has its upper end 31a fastened to the vehicle's inner side I of the mounting portion 25 (25C) by the bracket 37 above the vertical chamber 17D, while having its lower end 31c extended obliquely down and forward from the upper end 31a, and sewn and joined to the vehicle's inner side I of the horizontal portion 26a of the partitioning portion 26C. The length adjusters 31A and 31C are provided at their upper ends 31a with holes 31b for inserting the bolts 38 thereinto. The length adjuster 31B located intermediate in the front-rear direction has its upper end 31a sewn and joined to the vehicle's inner side I of the peripheral portion 24 above the partitioning portion 26B, while having its lower end 31c sewn and joined to the vehicle's inner side I of the horizontal portion 26a of the partitioning portion 26B. The length adjuster 31 (31A, 31B and 31C) is made of flexible fabric woven of polyester yarns, polyamide yarns or the like.

Figure 8:
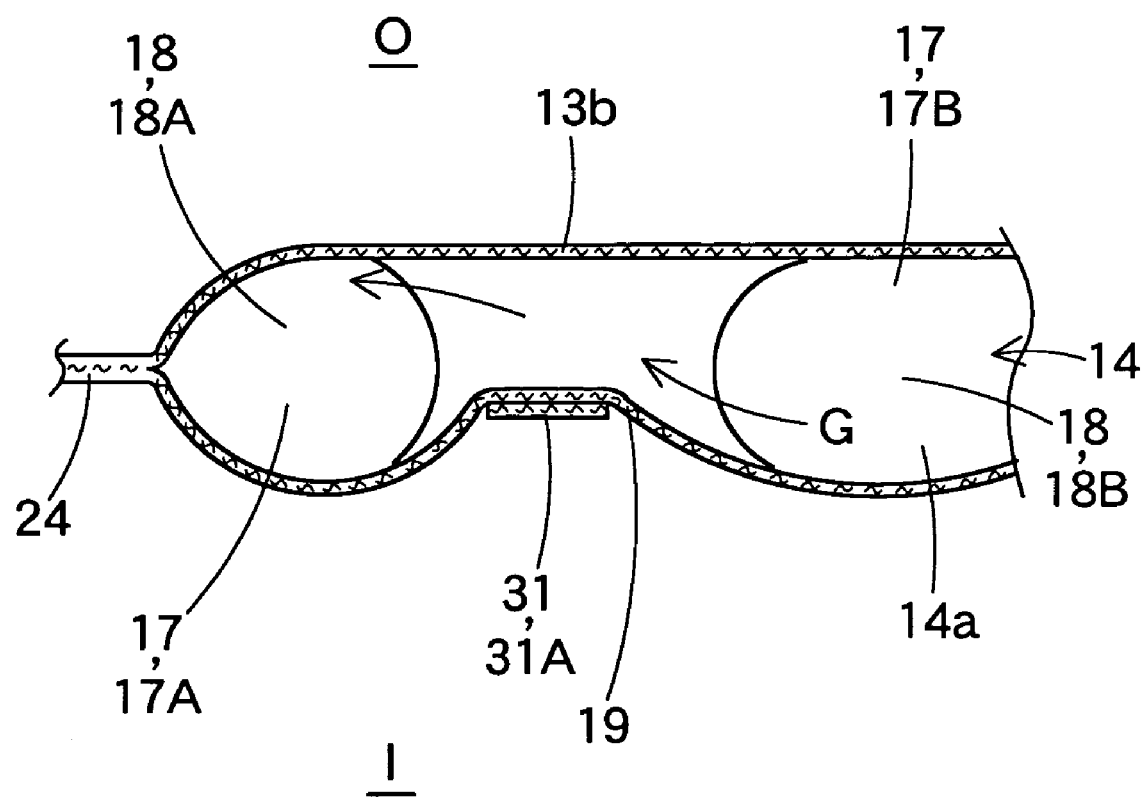
FIG. 8 is a partial enlarged horizontal section of the airbag of FIG. 2 in the inflation process, taken along line VIII-VIII in FIG. 7B.
Figure 9:
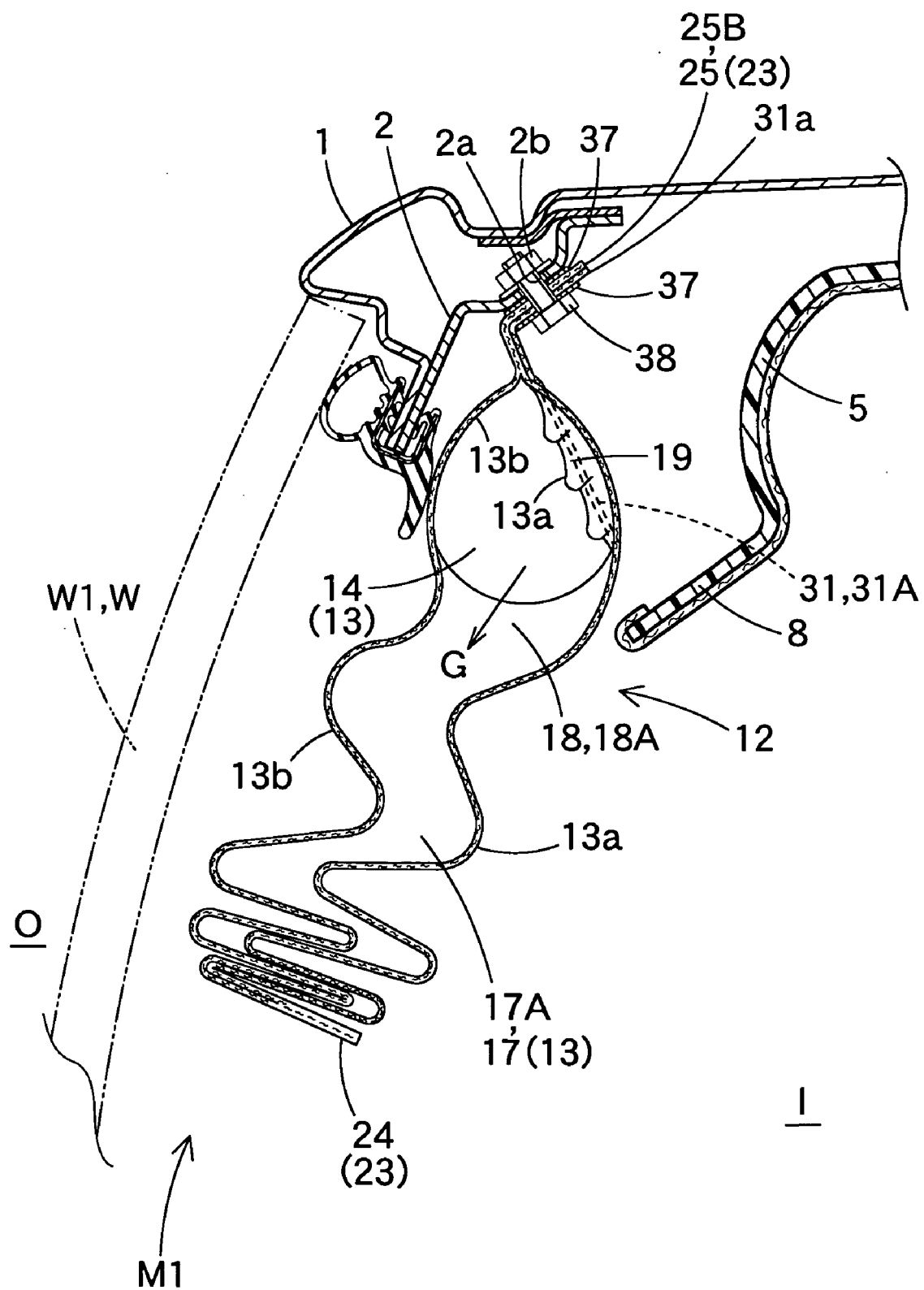
FIG. 9 is a partial enlarged vertical section of the airbag of FIG. 2 in the inflation process, taken along line IX-IX in FIG. 3.

Upon inflow of inflation gas G, each length adjuster 31 helps guide inflation gas G in the periphery of the communication ports 18A, 18B and 18C of the individual vertical chambers 17A, 17B and 17C in the gas feed passage 14 such that inflation gas G flows down obliquely toward the vehicle's exterior O into the vertical chambers 17A, 17B and 17C via the communication ports 18A, 18B and 18C. Each length adjuster 31 guides inflation gas G in predetermined direction by shortening substantial length of the vehicle's inner wall 13a than that of the outer wall 13b. In the foregoing embodiment, each belt 31 is shorter than a clearance between the peripheral portion 24 and the horizontal portion 26a of the partitioning portion 26 in the gas feed passage 14 as the air bag 12 is flatly expanded. Moreover, the substantial vertical length L of the gas feed passage 14 in the vehicle's inner wall 13a is predetermined slightly shorter than a inner diameter DO of the cylindrical gas feed passage 14 as inflated without the belt 31 (refer to FIGS. 4A and 4B). Upon deployment of the airbag 12, as shown in FIGS. 8 and 9, the length adjuster 31 forms guide portions 19 where the inner wall 13a is risen toward the vehicle's exterior O in the periphery of the communication ports 18A, 18B and 18C of the individual vertical chambers 17A, 17B and 17C in the gas feed passage 14. Each of the guide portions 19 directs inflation gas G obliquely down toward the vehicle's exterior O and guides it into the vertical chambers 17A, 17B and 17C. In the foregoing embodiment, each of the guide portions 19 is configured such that the vehicle's inner wall 13a rises gently toward the exterior O from general portion 14a above the centers of the communication ports 18A, 18B and 18C neighboring one another (from general portion 14a of the gas feed passage 14 that is apart from locations of the length adjuster 31), in upstream part of inflation gas G in the periphery of the communication ports 18A, 18B and 18C in the gas feed passage 14.

Width of each length adjuster 31 is predetermined shorter than a dimension of the horizontal portion 26a of each of the partitioning portions 26 in the front-rear direction, and substantially equal to the dimension of each of the mounting portions 25 in the front-rear direction.

Figure 11:
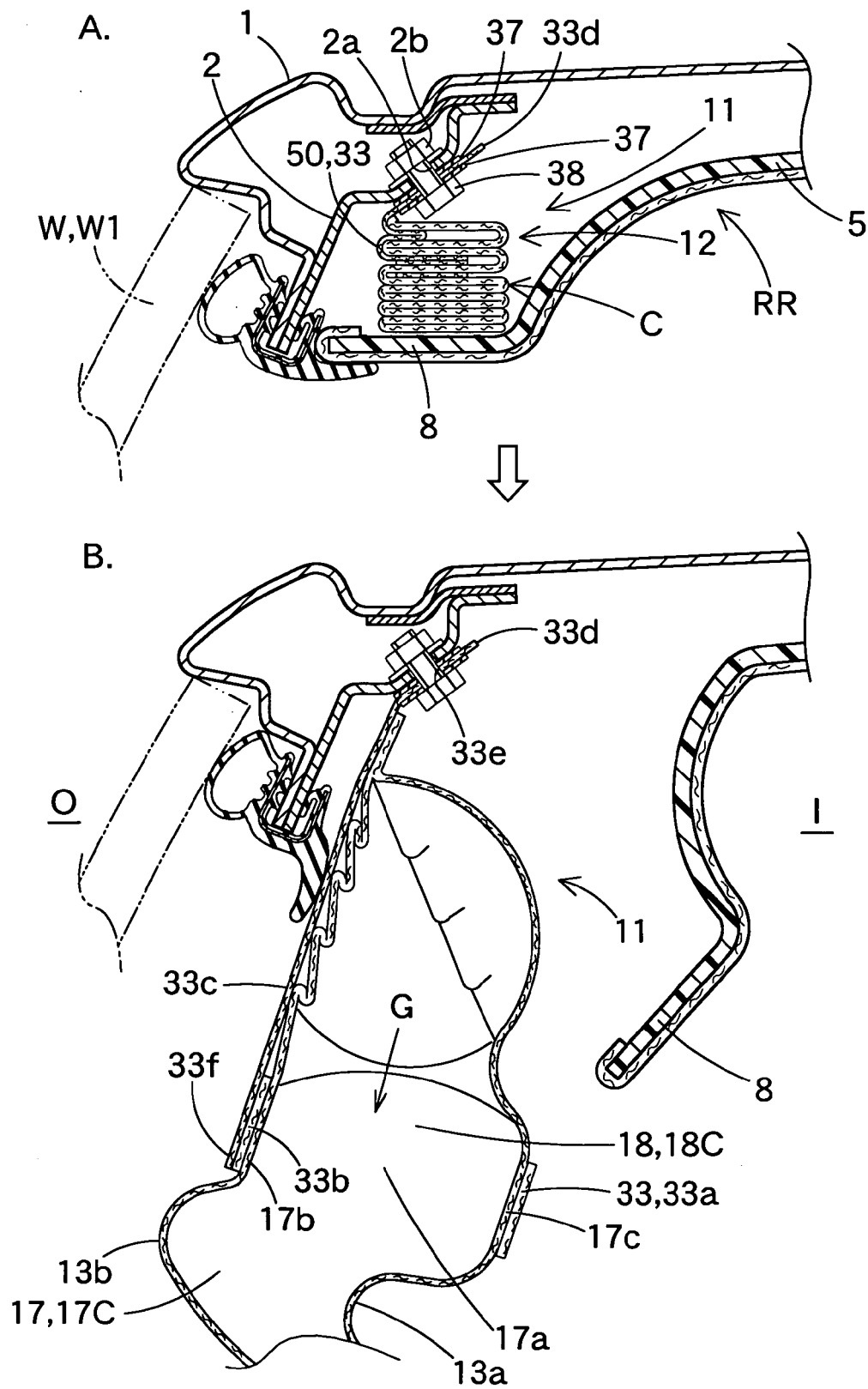
FIG. 11 are partial enlarged vertical sections illustrating the inflation process of the airbag of FIG. 2, taken along line XI-XI in FIG. 3.

Referring to FIGS. 3 and 5, the suspender belt 33 includes a cylindrically shaped ring portion 33a and a joint portion 33c. The joint portion 33c is elongated upward with its lower end 33f connected to a portion 33b of the ring portion 33a at the vehicle's exterior side O. The suspender belt 33 is made of flexible fabric woven of polyester yarns, polyamide yarns or the like, as the length adjuster 31. The ring portion 33a is put through the individual slits 27 formed in the partitioning portions 26B and 26C, so that the ring portion 33a contacts an outer circumference of upper part 17a of the vertical chamber 17C as completely inflated to wrap the upper part 17a. The joint portion 33c is provided at its upper end with a hole 33e for inserting the bolt 38 therethrough and, as referred to FIG. 11, is secured to the inner panel 2 at a housing position 11 of the airbag 12 by the bolt 38 after being clamped by a bracket 37, as the mounting portions 25.

The joint portion 33c is predetermined shorter than a clearance between the peripheral portion 24 and upper end 27a of the slit 27 in the gas feed passage 14 as the airbag 12 is flatly expanded. Upon deployment of the airbag 12, the joint portion 33c holds down the vehicle's inner portion 17c of the upper part 17a in the vertical chamber 17C, and lifts the vehicle's outer portion 17b of the upper part 17a toward the housing position 11. When the airbag 12 is completely inflated, then, as referred to FIG. 12, the joint portion 33c turns the lower part 17d around the upper part 17a toward the exterior O, such that the vertical chamber 17C is pressed toward the window W1. In the foregoing embodiment, the joint portion 33c is predetermined slightly shorter than the clearance between the peripheral portion 24 and the upper end 27a as the cylindrical gas feed passage 14 is inflated without the belt 31.

To mount the airbag device M1 on the vehicle V, each length adjuster 31 is firstly sewn to the airbag 12. A member for forming the ring portion 33a is inserted through the slits 27 of the airbag 12, and then its both ends are joined to each other to form the ring portion 33a. In the meantime, the joint portion 33c is joined to the ring portion 33a to locate the suspender belt 33 in the airbag 12. Subsequently, the airbag 12 as flatly expanded is bellows-folded together with the length adjuster 31 and the suspender belt 33, sequentially on crest and valley folds C, as indicated by double-dotted lines in FIG. 2, and as shown in FIGS. 7 and 11, such that the lower edge 12b side of the airbag 12 is brought closer to the upper edge 12a side.

After being folded up, the airbag 12 is wrapped at predetermined positions by unillustrated breakable tape for keeping the folded-up configuration. By attaching the inflator 39, the mounting brackets 37 and 40 thereto, an airbag module is formed.

Then the individual mounting brackets 37 and 40 are located at predetermined positions of the inner panel 2 as a member of the body 1, and are fixed thereto by inserting the bolts 38 and 41 into the mounting holes 25a, 31b and 33e and fastening them to the inner panel 2. Thus the airbag module is attached to the vehicle body 1. Subsequently, an unillustrated lead wire extending from a predetermined control device for actuating the inflator is connected to the inflator 39. If the front pillar garnish 4, the roof head lining 5, and further the rear pillar garnish 6 and the center pillar garnish 7 are attached to the vehicle body 1, the airbag device M1 is mounted on the vehicle V.

When the inflator 39 is actuated after the airbag device M1 is mounted on the vehicle V, inflation gas G is discharged from the inflator 39 and flows into the gas feed passage 14 from the joint port 22, and then flows through the gas feed passage 14 in both front and rear directions, as indicated by double-dotted lines in FIGS. 2 and 3. Then the gas G is supplied to each of the vertical chambers 17 (17A, 17B, 17C, 17D, 17E, 17F, 17G and 17H) via each of the communication ports 18, so that each of the admissive portions 15 and 16 of the airbag 12 starts to inflate while unfolding. The airbag 12 then breaks the tape that had wrapped the airbag, pushes and opens the airbag cover 8 in the lower edges 4a and 5a of the front pillar garnish 4 and the roof head lining 5, and inflates to cover the vehicle's inner side I of the windows W1 and W2, the center pillar CP, and the rear pillar RP, as indicated by double-dotted lines in FIG. 1, while protruding downward.

As the gas feed passage 14 starts to inflate, the substantial lengths of the vehicle's outer wall 13a and the inner wall 13b become differentiated by the length adjusters 31A, 31B and 31C, so that the guide portions 19 where the vehicle's inner wall 13a is protruded toward the vehicle's exterior O from the general portion 14a of the gas feed passage 14 are formed respectively in the periphery of the communication ports 18A, 18B and 18C in the gas feed passage 14 (refer to FIGS. 7A, 7B and 8). Thus, inflation gas G is directed toward the exterior O by the guide portions 19 after running forward through the gas feed passage 14, and then flows into the vertical chambers 17A, 17B and 17C via the individual communication ports 18A, 18B and 18C located in downstream part of inflation gas G, as shown in FIGS. 8 and 9. In other words, since the guide portions 19 guide inflation gas G to flow into the vertical chambers 17A, 17B and 17C obliquely down and toward the vehicle's exterior O, the vertical chambers 17A, 17B and 17C deploy downward along the window W1, as indicated by double-dotted lines in FIG. 10, so that the entire airbag 12 also deploys along the windows W1 and W2, and then completes inflation as indicated by double-dotted lines in FIG. 1 and solid lines in FIG. 10. Here, in an area above the communication ports 18B and 18C, inflation gas G partially flows into the vertical chambers 17B and 17C via the communication ports 18B and 18C, and the remainder flows forward through the gas feed passage 14.

As thus described, in the first embodiment M1 of the head-protecting airbag device according to the present invention, with respect to the periphery of the communication ports 18A, 18B and 18C in the gas feed passage 14 of the airbag 12, deployment of the airbag 12 along the windows W1 and W2 is secured by merely differentiating the substantial lengths of the vehicle's outer wall 13b and the inner wall 13a. Moreover, as an arrangement to differentiate the substantial lengths of the vehicle's outer wall 13b and the inner wall 13a, the airbag 12 is provided with the flexible length adjuster 31 (31A, 31B and 31C) as a gas flow regulating means 50 such that tucks 20 are formed in the vehicle's inner wall 13a in the gas feed passage 14. That is, in the foregoing embodiment, the means 50 to enable the deployment along the windows W1 and W2 is constructed by the airbag 12 itself, which dispenses with a separate member conventionally located in a pillar portion. Therefore, the airbag device M1 is made compact. In the airbag device M1, furthermore, mounting work on the vehicle V is facilitated since the airbag 12 deployable along the windows W1 and W2 can be mounted on the vehicle V by folding and housing the airbag 12 in the upper edge of the windows W1 and W2 together with the aforementioned length adjuster 31.

Therefore, the head-protecting airbag device M1 is able to ensure the deployment of the airbag 12 along the windows W1 and W2 and is made compact, so that workability is improved in the mounting work of the airbag on the vehicle V.

Figure 12:
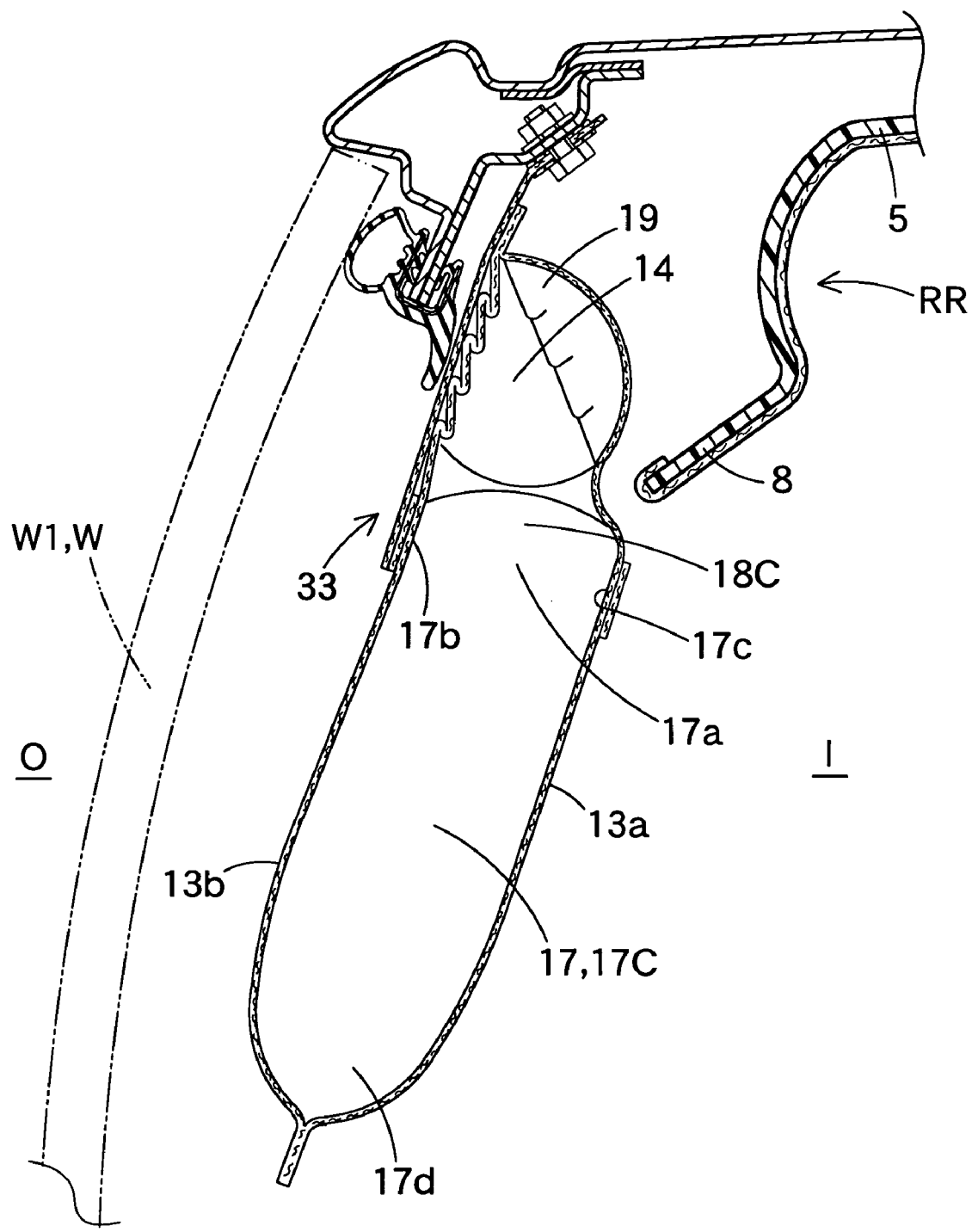
FIG. 12 is an enlarged section of the airbag of FIG. 2 in a completely inflated condition following the condition of FIG. 11.
Figure 13:
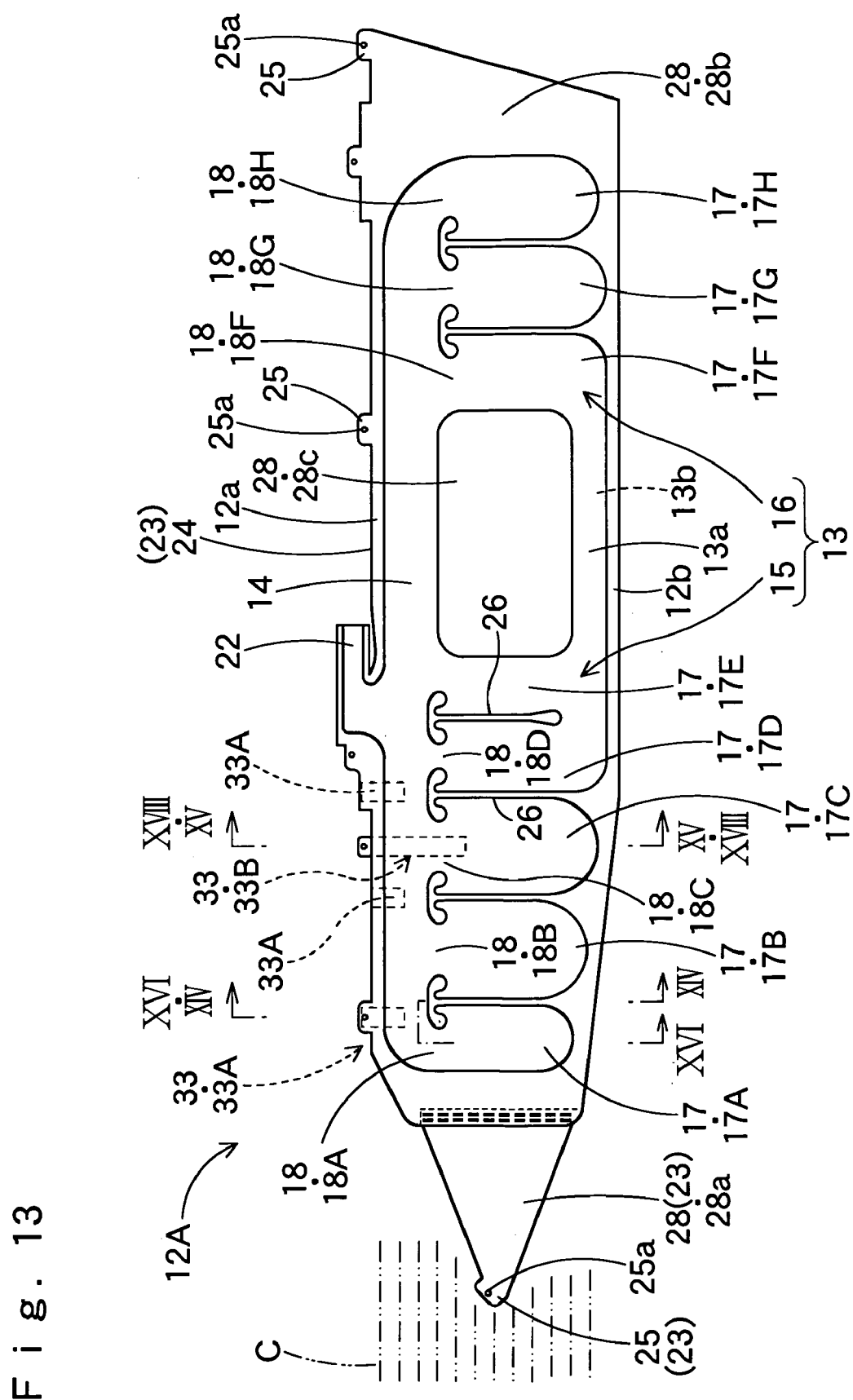
FIG. 13 is a front view of a modification of the airbag of the first embodiment as flatly expanded.
Figure 14:
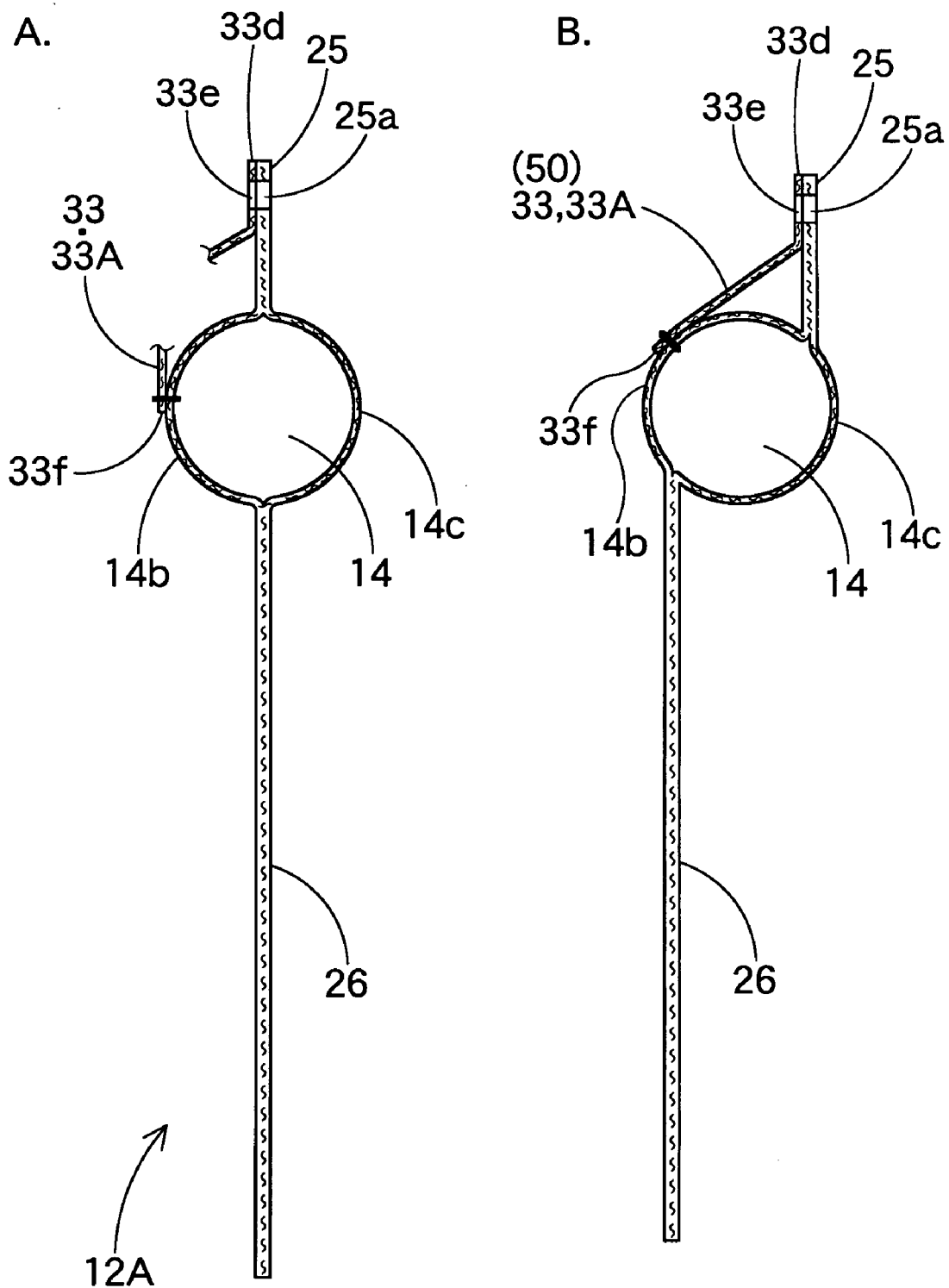
FIG. 14 are schematic enlarged sections taken along line XIV-XIV in FIG. 13 as the airbag is inflated.
Figure 15:
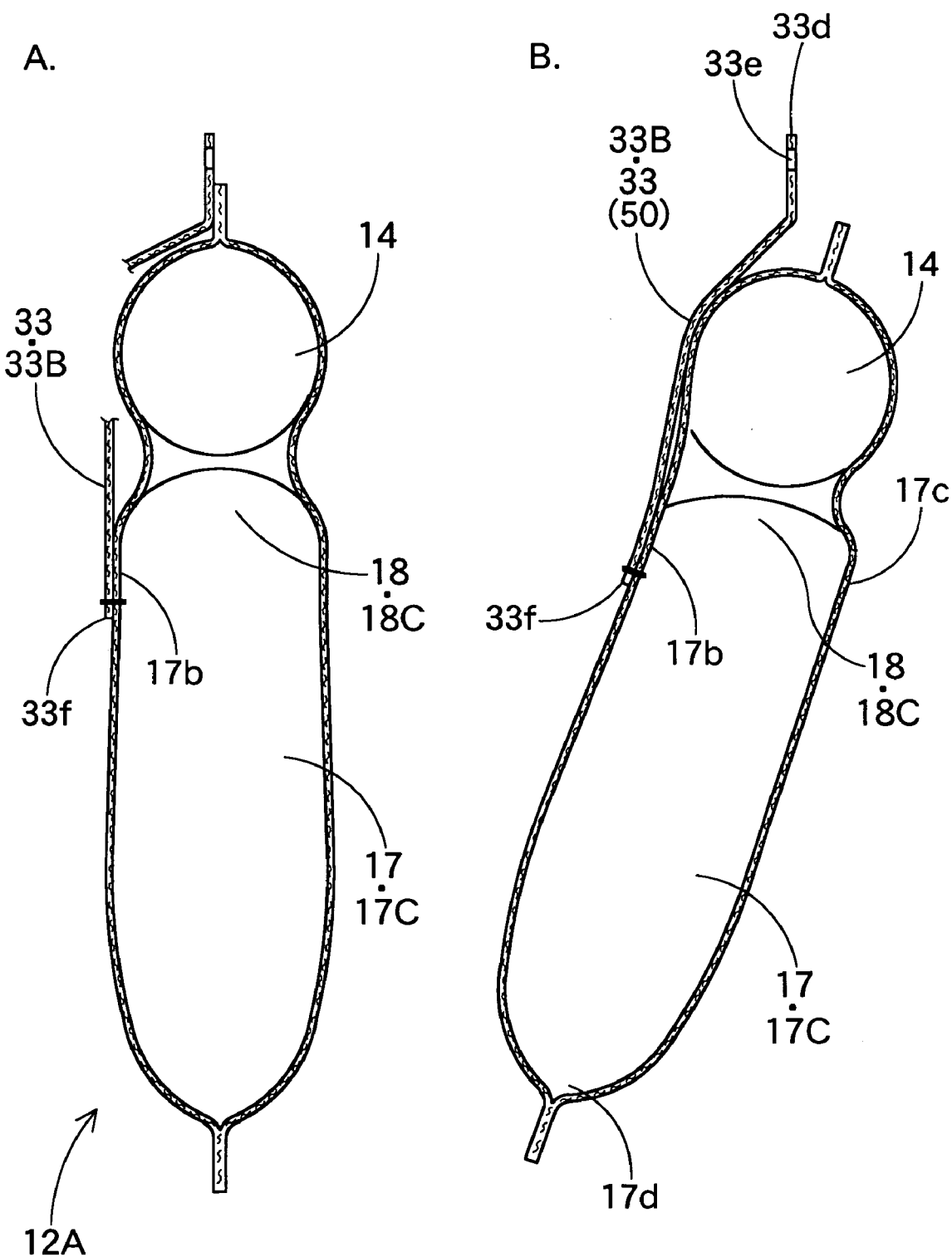
FIG. 15 are schematic enlarged sections taken along line XV-XV in FIG. 13 as the airbag is inflated.

In addition, in the airbag device M1, upon deployment of the airbag 12, as referred to FIGS. 11A and 11B, the suspender 33 located at vehicle's exterior side O of the airbag 12 holds down the vehicle's inner portion 17c of the vertical chamber 17C in its upper part 17a while lifting the vehicle's outer side portion 17b in the upper part 17a toward the housing position 11, so that the vertical chamber 17C is pressed toward the window W1 with the lower part 17d turning around the upper part 17a toward the exterior O. Consequently, the vertical chamber 17C deploys along the window W1 including the lower part 17d, as shown in FIG. 12, so that the entire airbag 12 deploys along the window W1 and completes inflation.

With this arrangement, too, deployment of the airbag 12 along the windows W1 is secured by merely locating a flexible suspender belt 33 as a gas flow regulating means 50 that is joined to at least one vertical chamber 17C and to the vehicle body 1 in the vicinity of the housing position 11 of the airbag 12. Since a separate member conventionally located in a pillar portion is not required, the airbag device M1 can be made compact. Moreover, this suspender belt 33 has flexibility, and is joined to the vehicle body 1 in the vicinity of the housing position 11 of the airbag 12 and to the airbag 12. Accordingly, if the airbag 12 is folded up together with the suspender belt 33 joined with the airbag 12, and is housed in the upper edge of the window W1 with the suspender belt 33 joined to the inner panel 2 of the body 1, the airbag 12 that is deployable along the window W1 is easily mounted on the vehicle V, so that the mounting work on the vehicle V is facilitated.

With this arrangement, too, therefore, the head-protecting airbag device M1 is able to ensure the deployment of the airbag 12 along the windows W1 and W2 and is made compact, so that workability is improved in the mounting work on the vehicle V.

Although the airbag 12 is provided both with the length adjuster 31 and the suspender belt 33, it will also be appreciated to employ only either one of the length adjuster 31 or the suspender belt 33.

Moreover, although the airbag 12 includes the length adjusters 31A, 31B and 31C respectively located in upper positions of the three partitioning portions 26A, 26B and 26C in the front admissive portion 15 in the gas feed passage 14, the length adjuster may be located in upper position of either one of the partitioning portions such as the partitioning portion 26C. The length adjuster may also be located in the gas feed passage 14 in the rear admissive portion 16. However, if the length adjuster is located near the inflator 39 or in upstream part of inflation gas G, the airbag 12 is able to deploy along the windows W1 and W2 swiftly.

Although the illustrated embodiment shows the airbag 12 including one suspender belt 33, the suspender belt 33 may be located in other vertical chambers 17, too. For example, the belt 33 may be located in at least one of the vertical chambers such as 17G in the rear admissive portion 16.

In the airbag 12, furthermore, the suspender belt 33 includes the ring portion 33a that encircles the outer circumference of the upper part 17a of the inflated vertical chamber 17. However, it will also be appreciated that the joint portion 33c may be joined directly at its lower end to the upper part of a vertical portion 26b of the partitioning portion 26 next to the upper part 17a, as long as the vertical chamber 17 as inflated is pressed toward the windows W1 and W2.

In addition, if the vertical chamber 17 as inflated can be pressed toward the windows W1 and W2, the lower end of the suspender belt 33 may be joined to a vertical chamber 17 or the gas feed passage 14. More specifically, as referred to FIGS. 13 to 19, the lower end 33f of the suspender belt 33A as a gas flow regulating means 50 may be joined to the vehicle's outer side 14b in a lower part or vertically intermediate position of the gas feed passage 14, or alternatively, the lower end 33f of the suspender belt 33B as a gas flow regulating means 50 may be joined to the vehicle's outer side 17b in a vertically intermediate position or an upper part of the vertical chamber 17, for example.

Figure 16:
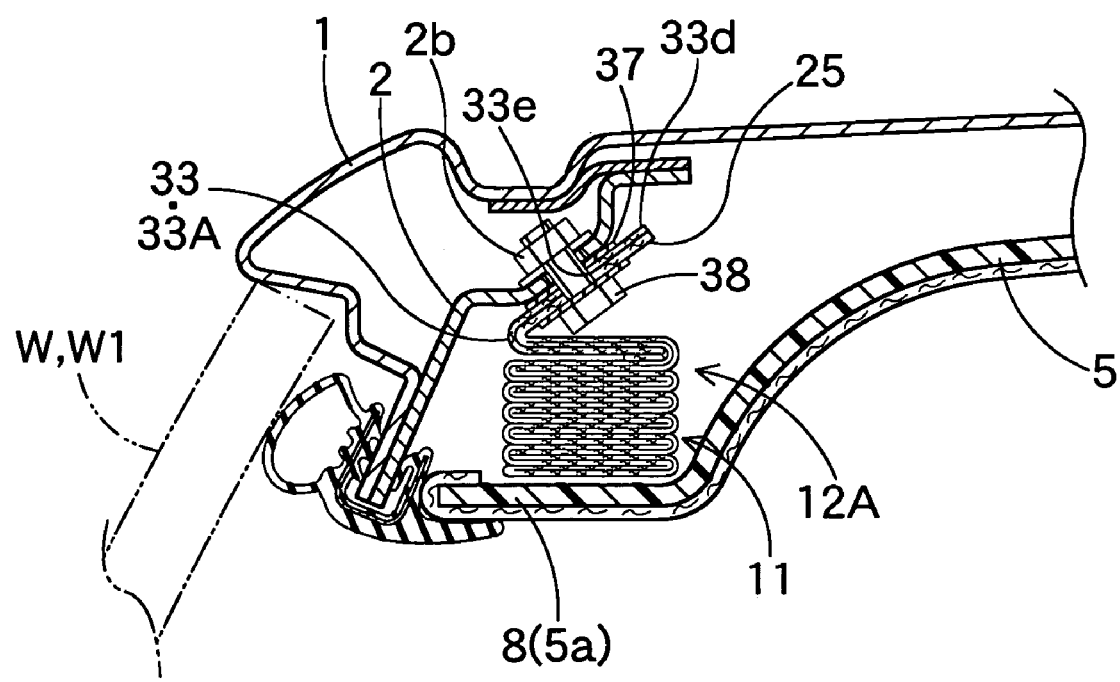
FIG. 16 is a partial enlarged vertical section of the airbag shown in FIG. 13 in a housed state, taken along line XVI-XVI in FIG. 13.
Figure 17:
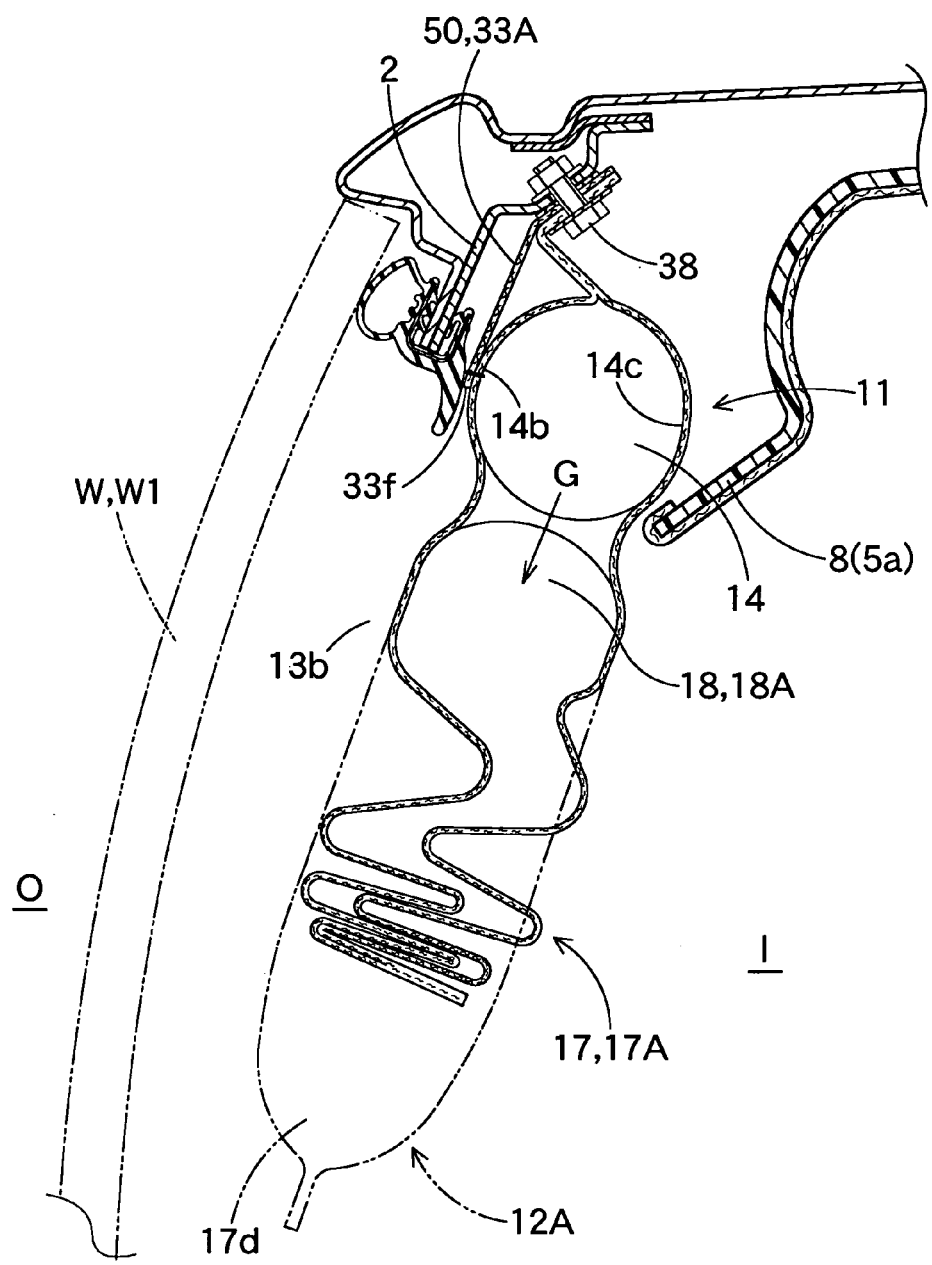
FIG. 17 is a partial enlarged vertical section of the airbag part shown in FIG. 16 being inflated.
Figure 18:
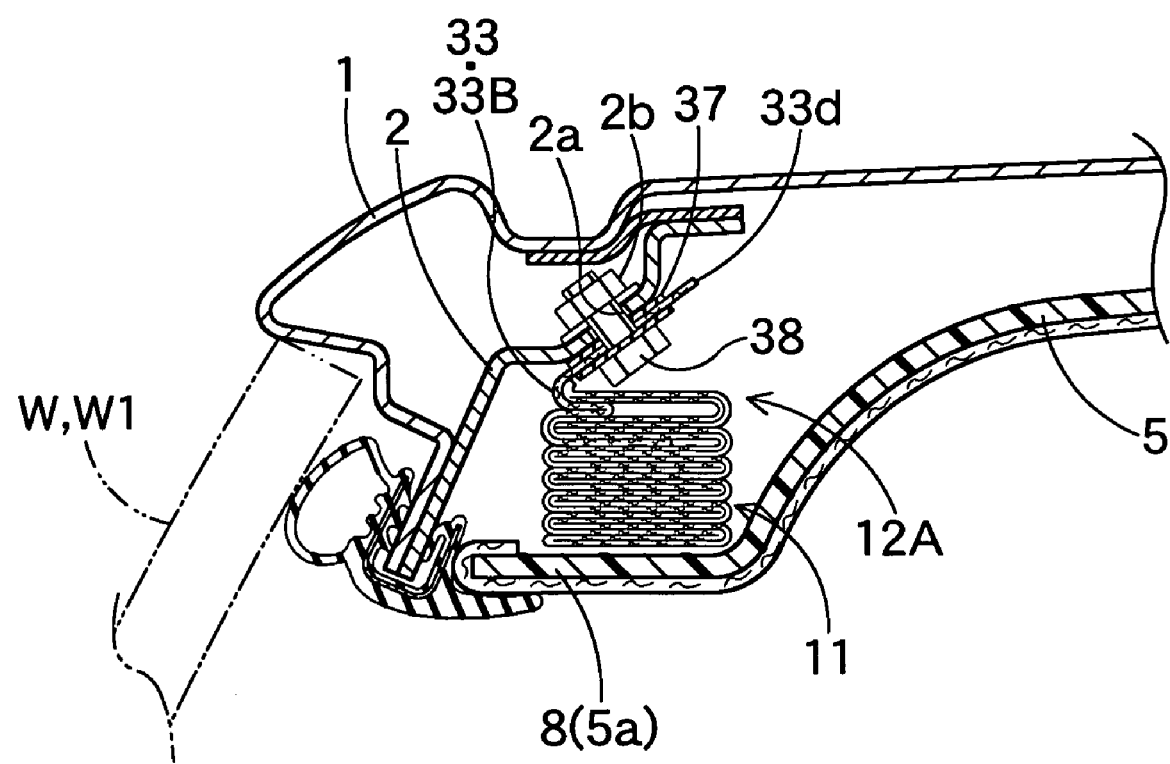
FIG. 18 is a partial enlarged vertical section of the airbag shown in FIG. 13 in a housed state, taken along line XVIII-XVIII in FIG. 13.
Figure 19:
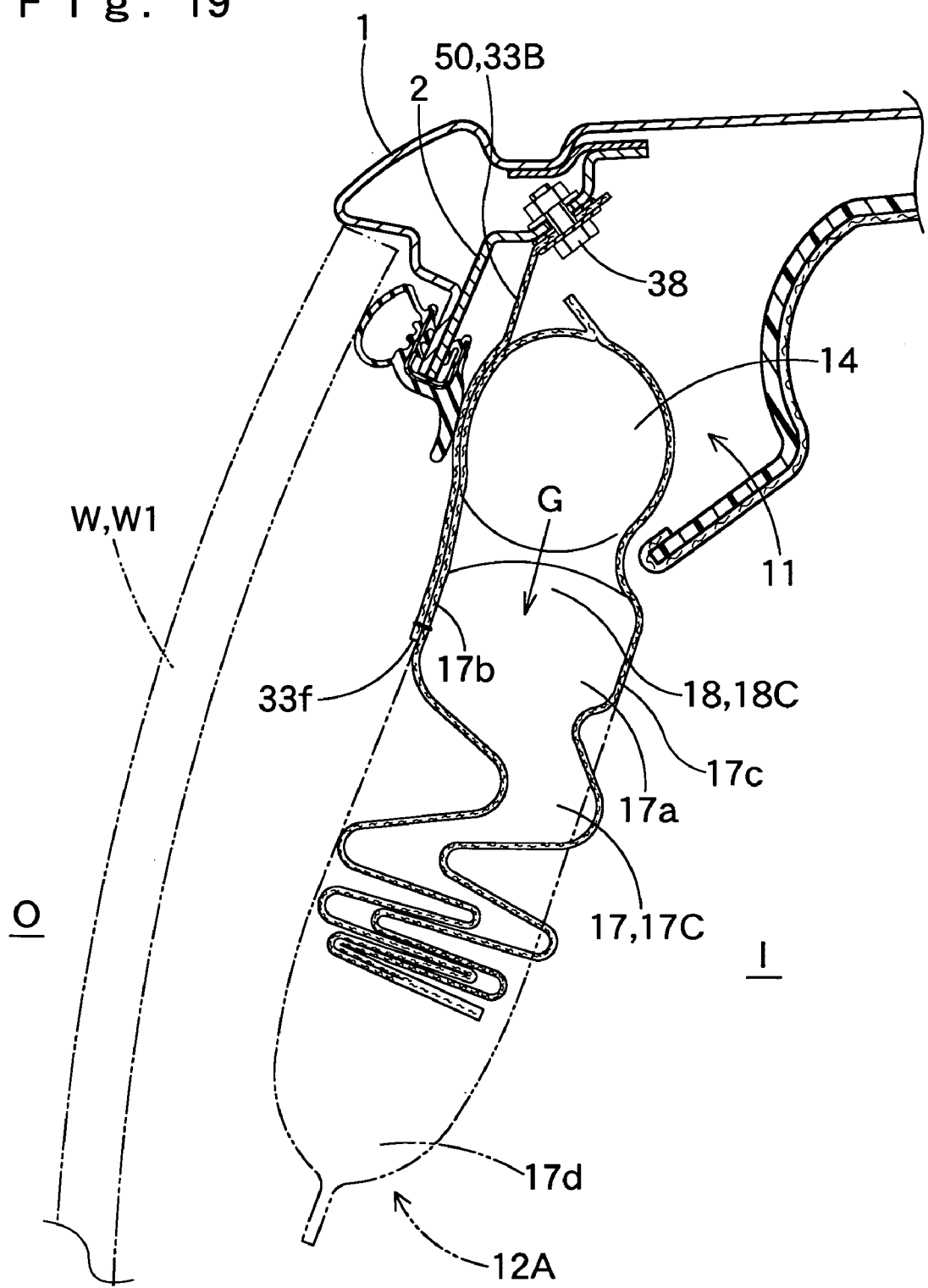
FIG. 19 is a partial enlarged vertical section of the airbag part shown in FIG. 18 being inflated.
Figure 20:
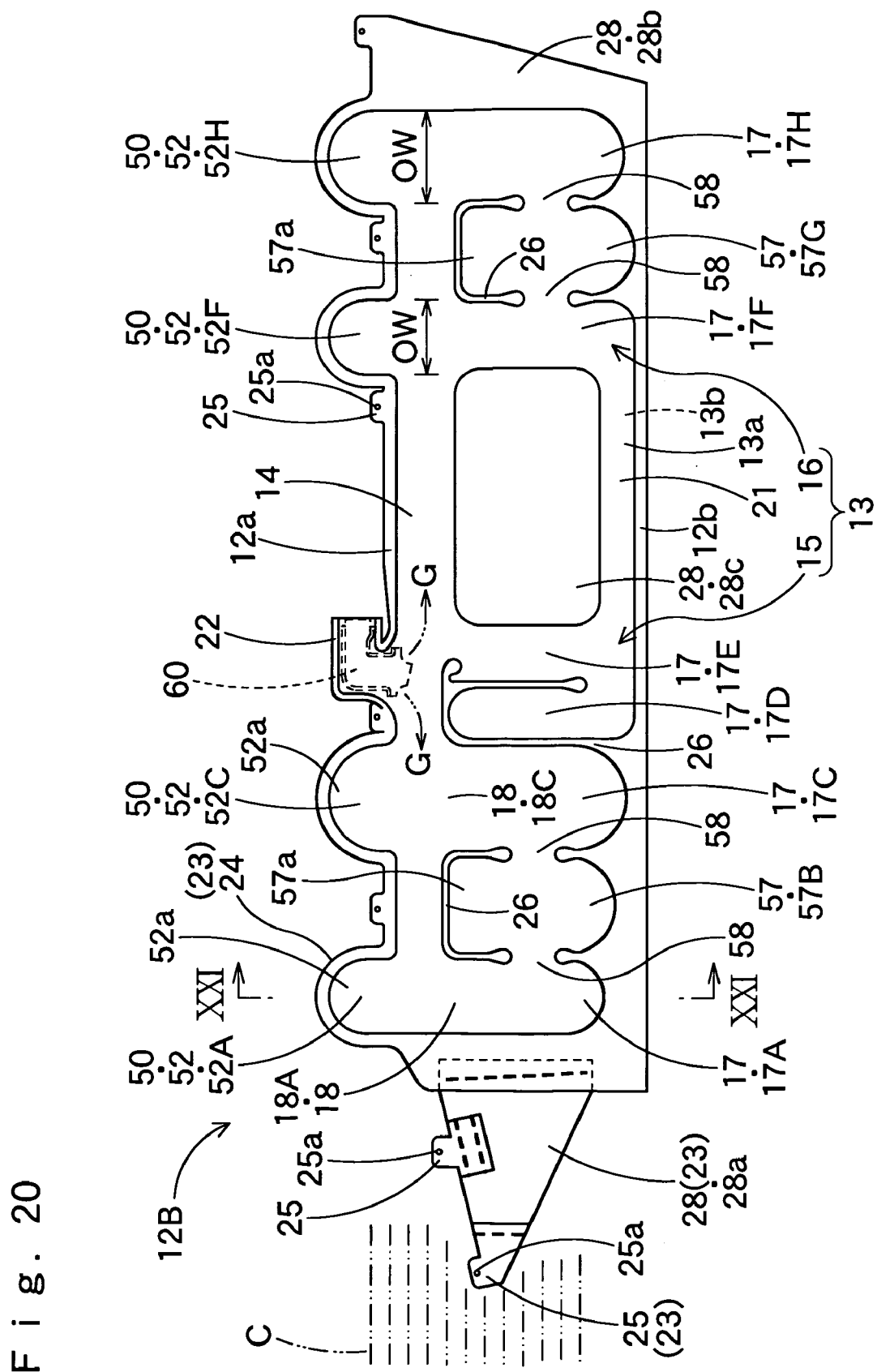
FIG. 20 is a front view of an airbag used in a second embodiment of the head-protecting airbag device as flatly expanded.

In this airbag 12A, too, as shown in FIGS. 16 and 17, upon deployment, the suspender belt 33A located in the vehicle's exterior side O of the airbag 12A helps slant the periphery of the communication port 18A of the vertical chamber 17A in the gas feed passage 14 such that the vehicle's inner portion 14c is lowered and the outer portion 14b is lifted, and thus inflation gas G flowing into the vertical chamber 17A from the communication port 18A is directed obliquely down and toward the vehicle's exterior O. As shown in FIGS. 18 and 19, the suspender belt 33B located in the vehicle's exterior side O of the airbag 12A also helps the vertical chamber 17C to be pressed toward the window W1 by lowering the vehicle's inner portion 17c in the upper part 17a while lifting the vehicle's outer portion 17b in the upper part 17a toward the housing position 11, and thus turning the lower part 17b of the vertical chamber 17C toward the vehicle's exterior O around the upper part 17a. Consequently, as shown in FIGS. 17 and 19, the vertical chambers 17A and 17C deploy along the window W1 including the lower parts 17d, and thus the entire airbag 12A deploy along the windows W1 and W2, and completes inflation.

FIGS. 20 to 23 illustrate a second embodiment of the head-protecting airbag device of the present invention, which will be called a head-protecting airbag device M2 below. An airbag 12B included in the airbag device M2 is, as the airbag 12, manufactured by hollow-weaving method utilizing polyamide yarns or the like, and includes a gas admissive portion 13 inflatable upon inflow of inflation gas G by separating a vehicle's inner wall 13a and an outer wall 13b, and a non-admissive portion 23 which is formed by joining the vehicle's inner wall 13a and the outer wall 13b and admits no inflation gas G. Unlike the airbag 12, however, the airbag 12B includes neither a length adjuster 31 nor a suspender belt 33, but instead includes inflatable auxiliary chambers 52 as a gas flow regulating means 50 in the gas admissive portion 13.

Auxiliary chambers 52 (52A, 52C, 52F and 52H) of the airbag 12B are located above the gas feed passage 14 as completely inflated, and are adapted to inflate between the inner panel 2A as part of vehicle body 1 and the lower edge 5a of the roof head lining 5 as an airbag cover 8 for covering the vehicle's interior side I in an openable manner in the vicinity of the housing position 11 of the airbag 12B. In the second embodiment, the auxiliary chambers 52 (52A, 52C, 52F and 52H) are located above the vertical chambers 17A, 17C, 17F and 17H, respectively.

The opening dimension OW of each of the auxiliary chambers 52 in the front-rear direction is predetermined substantially equal to the opening dimension of each of communication ports 18 of the vertical chambers 17 opened at lower side of the auxiliary chambers 52 in the front-rear direction. Moreover, in the foregoing embodiment, widths OW of each of the auxiliary chambers 52 and of each of the vertical chambers 17, as the airbag 12B is flatly expanded, are predetermined substantially equal to each other.

Each of the auxiliary chambers 52 is located to project upward than each of the mounting portions 25 disposed in the upper edge 12a of the gas admissive portion 13. In the airbag 12B, in other words, the mounting portions 25 to be attached to the inner panel 2A of the vehicle body 1 are located below the upper ends 52a of the auxiliary chambers 52 and above the vertical chambers 17 when the airbag 12B is completely inflated.

The airbag 12B further includes inflatable secondary chambers (secondary vertical chambers) 57 (57B and 57G) at positions corresponding to the vertical chambers 17B and 17G of the airbag 12. Each of the secondary chambers 57 inflates in the vertical direction below the gas feed passage 14 upon deployment of the airbag 12B, and has its upper end 57a not communicated with the gas feed passage 14. In both front and rearwards of each of the secondary chambers 57B and 57G are located the vertical chambers 17 (17A, 17C, 17F and 17H) having the auxiliary chambers 52 thereabove. Each of the secondary chambers 57B and 57G is communicated with a lower part of at least one of the vertical chambers 17 located front and rearward thereof, and this communicated portion acts as an inlet port 58 for introducing inflation gas into the secondary vertical chambers 57B and 57G. In the illustrated embodiment, the inlet port 58 is located in both front and rear parts of each of the secondary chambers 57B and 57G.

Here in the airbag 12B, common members with the airbag 12 will be designated common reference numerals, and description thereof will be omitted. The airbag 12B further includes a flow regulating cloth 60 within a joint port 22.

The flow regulating cloth 60 is joined with unillustrated inflator 39 for helping inflation gas G to flow in both front and rear directions in the gas feed passage 14.

As the airbag 12, the airbag 12B is bellows-folded on folds C, and then is mounted on a vehicle together with the inflator 39 and unillustrated brackets 37 and 40 assembled with the airbag 12B.

Figure 21:
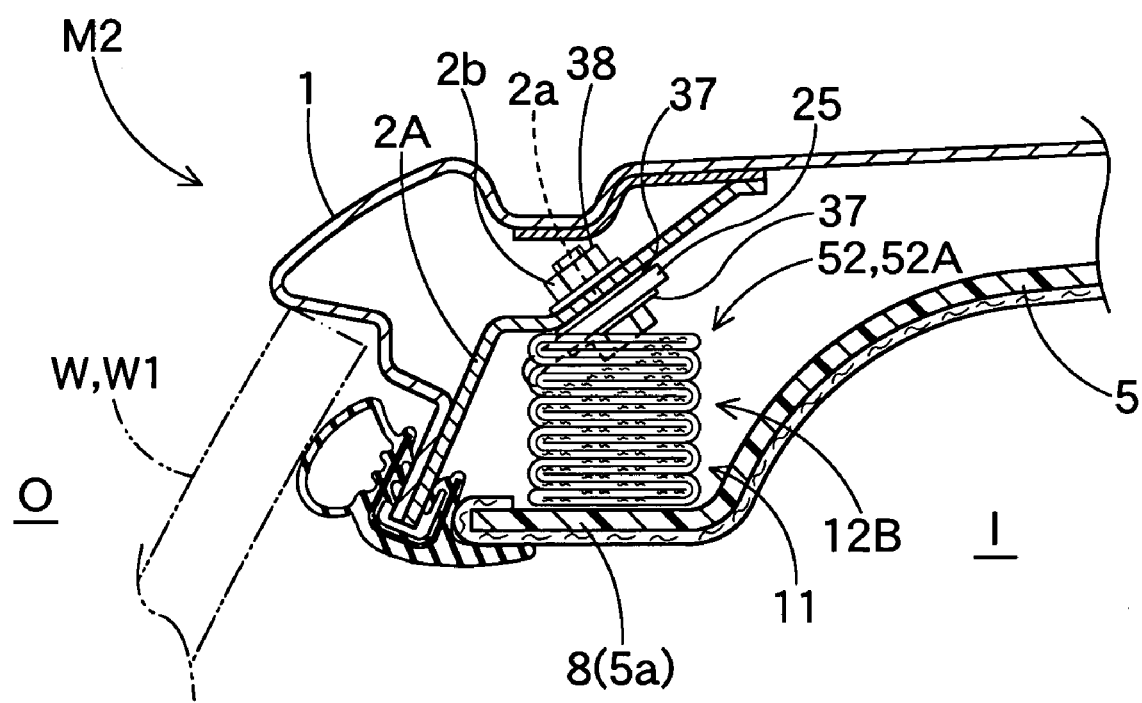
FIG. 21 is a partial enlarged vertical section of the airbag of FIG. 20 in a housed state, taken along line XXI-XXI in FIG. 20.
Figure 22:
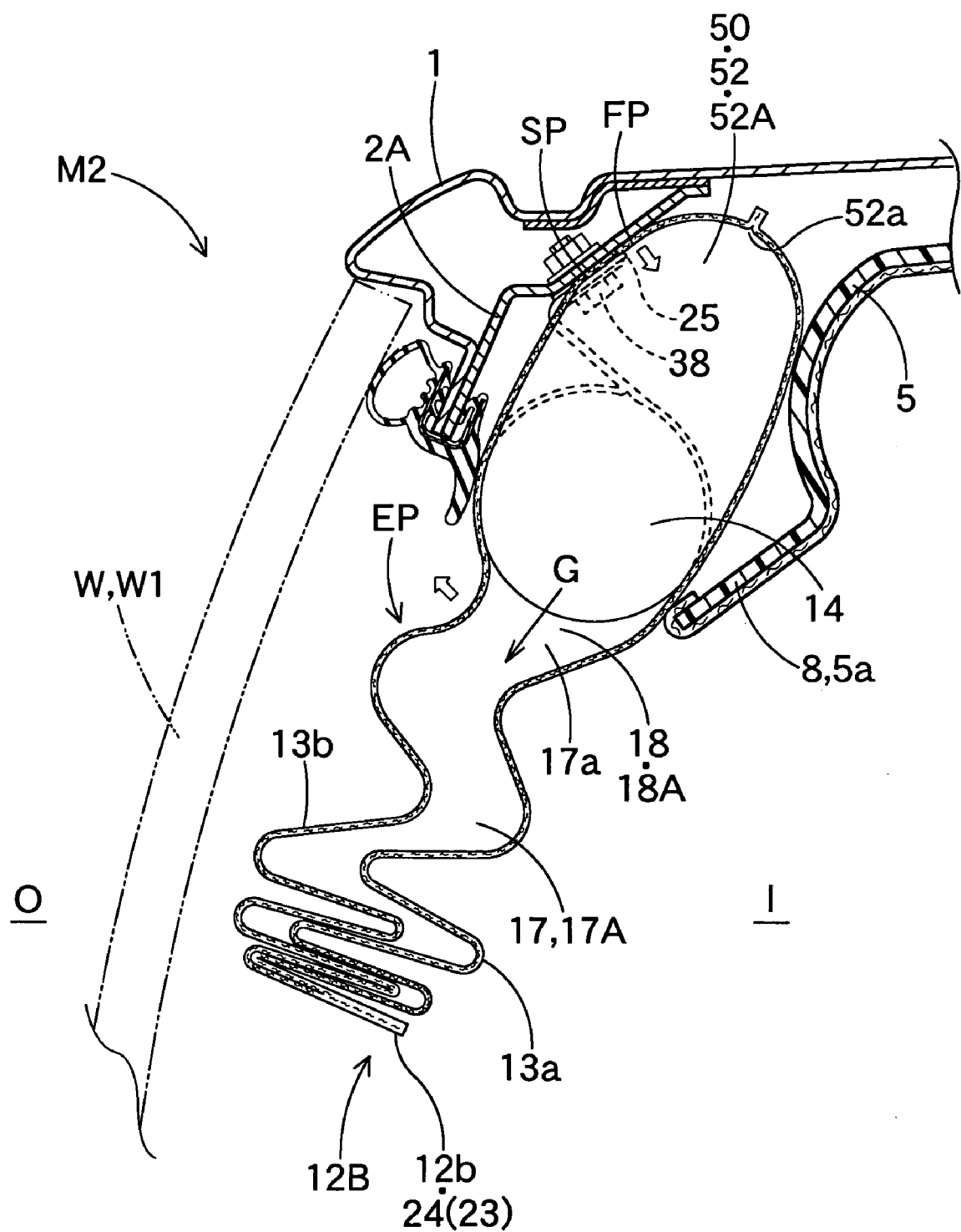
FIG. 22 is a partial enlarged vertical section of the airbag part shown in FIG. 21 being inflated.
Figure 23:
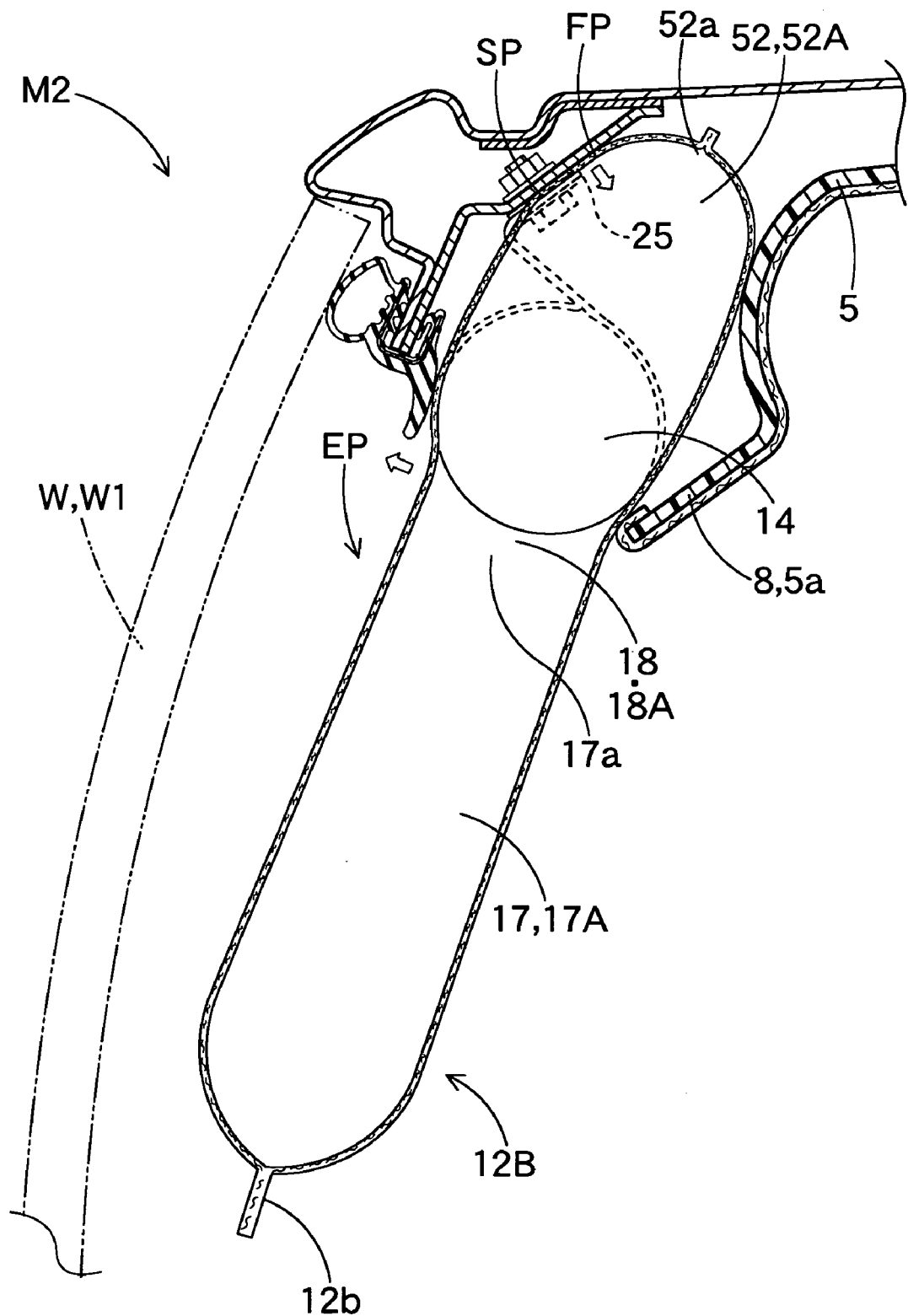
FIG. 23 is a partial enlarged vertical section of the airbag part shown in FIG. 22 completely inflated.
Figure 24:
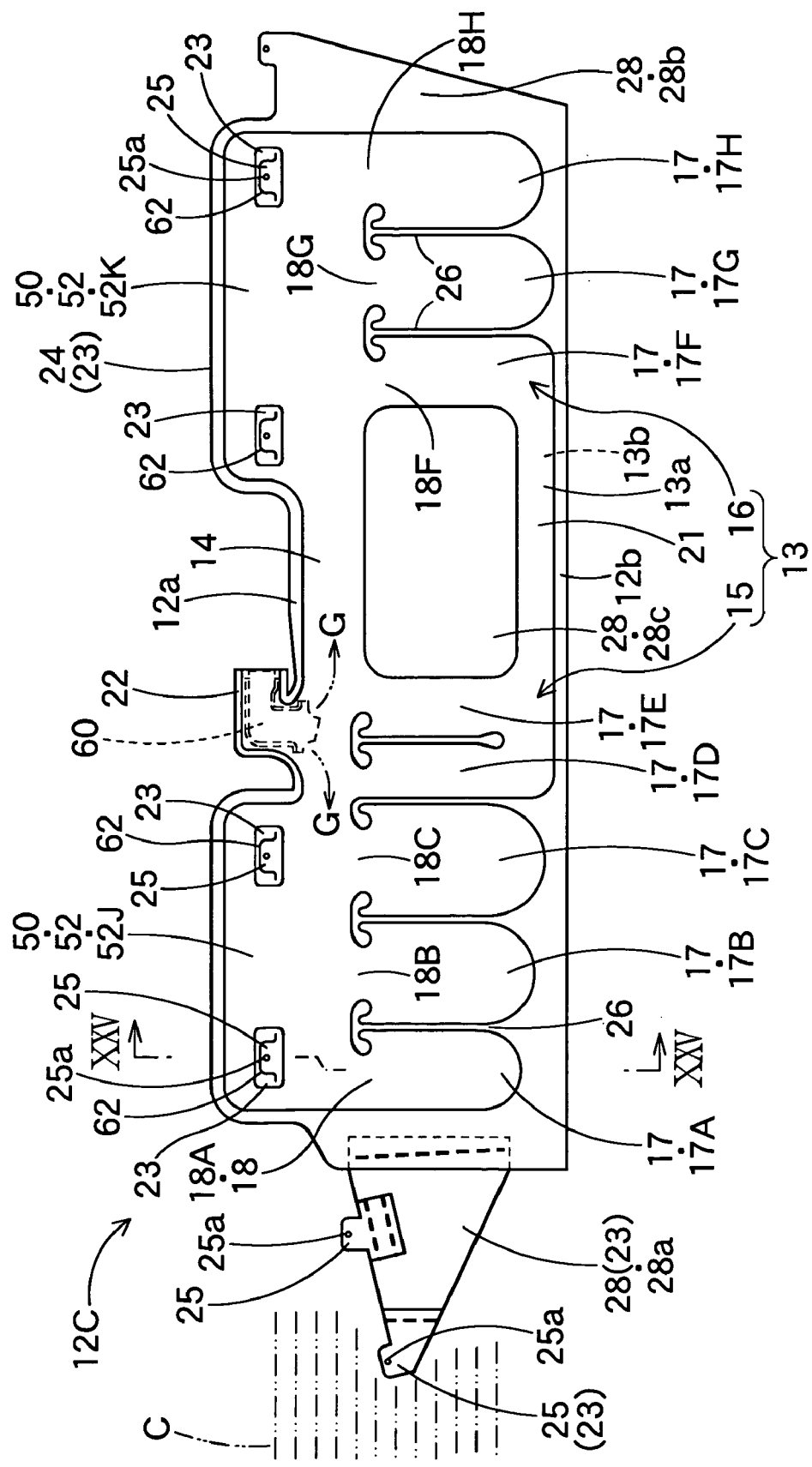
FIG. 24 is a front view of an airbag used in a third embodiment of the head-protecting airbag device as flatly expanded.

When inflation gas is discharged from the inflator 39, the airbag 12B of the head-protecting airbag device M2 inflates by admitting inflation gas G into the gas admissive portion 13, and then pushes and open an airbag cover 8 and deploy. When the auxiliary chambers 52 inflate together with the gas feed passage 14 in the initial stage of inflation of the airbag 12B, the gas feed passage 14 and the auxiliary chambers 52 are pushed by the airbag cover 8, and the auxiliary chambers 52 come to abut against the inner panel 2A as part of the vehicle body 1, as shown in FIGS. 21 and 22. At this time, since the inner panel 2A is slanted toward the vehicle's exterior O as it goes down, the auxiliary chambers 52 supported by the inner panel 2A direct their lower parts toward the exterior O. Then inflation gas G flowing into the vertical chambers 17 via the communication ports 18 from the gas feed passage 14 is directed down and toward the exterior O. As a result, as referred to FIG. 23, the vertical chambers 17 are pressed toward the window W while inflating.

This arrangement dispenses with a separate member conventionally located in a pillar portion by merely locating the auxiliary chambers 52 as a gas flow regulating means 50 in the gas admissive portion 13 of the airbag 12B. Therefore, the airbag device M2 is made compact, and workability is improved in the mounting work on the vehicle.

Especially in the second embodiment, the auxiliary chambers 52 are located above the plurality of (four, in the illustrated embodiment) vertical chambers 17A, 17C, 17F and 17H. Accordingly, all of the vertical chambers 17A, 17C, 17F and 17H located respectively below the plurality of auxiliary chambers 52 are able to deploy along the window W, which stabilizes the deployment of the entire airbag 12B along the window W.

In the second embodiment, moreover, the opening dimension OW of each of the auxiliary chambers 52 in the front-rear direction is substantially equal to the opening dimension of each of the communication ports 18 opened at lower side of the auxiliary chambers 52 in the front-rear direction. With this arrangement, each of the auxiliary chambers 52 inflates into a vertical rod-shape having rigidity together with the upper part 17a of the vertical chamber 17 located below the auxiliary chamber 52, thereby achieving further stable deployment of the vertical chamber 17 along the window W.

Furthermore, the airbag 12B is provided below the upper ends 52a of the auxiliary chambers 52 as completely inflated and above the vertical chambers 17 with the mounting portions 25 to be attached to the inner panel 2A. With this arrangement, when each of the auxiliary chambers 52 is inflated and supported by the inner panel 2A, each of the vertical chambers 17 is pressed toward the window W like a lever in which the mounting portion 25 serves as fulcrum SP, the auxiliary chamber 52 serves as effort-point FP, and the inflating vertical chamber 17 located below the auxiliary chamber 52 serves as resistance-point EP. In the airbag 12B, therefore, the vertical chambers 17 are able to deploy along the window W stably whether or not the airbag cover 8 presses the gas feed passage 14 and the auxiliary chambers 52.

In addition, the airbag 12B includes the secondary chambers 57 (57B and 57G) that inflate vertically below the gas feed passage 14 upon airbag deployment and are not communicated at the upper ends 57a with the gas feed passage 14. In both front and rearwards of each of the secondary chambers 57 (57B and 57G) are located the vertical chambers 17 (17A, 17C, 17F and 17H) having the auxiliary chambers 52 thereabove. Moreover, each of the secondary chambers 57 includes the inlet port 58 for inflation gas G communicated with lower part of at least one of the vertical chambers 17 located front and rearwards of the secondary chamber 57. With this arrangement, the secondary chambers 57 are able to complete downward expansion in a thin condition before admitting inflation gas G along with expansion of the both vertical chambers 17 located front and rearwards thereof, and then inflate by admitting inflation gas G from the inlet ports 58. Accordingly, the airbag 12B is able to deploy the secondary chambers 57 smoothly even in a narrow space between occupants and the window W.

In the airbag 12B of the airbag device M2, the auxiliary chambers 52 (52A, 52C, 52F and 52H) are located separately from one another above the vertical chambers 17 (17A, 17C, 17F and 17H), respectively. However, the airbag device may be arranged as a head-protecting airbag device M3 shown in FIGS. 24 to 27, which is a third embodiment of the present invention. In the airbag device M3, an airbag 12C is, as the airbag 12, manufactured by hollow-weaving method utilizing polyamide yarns or the like, and includes a gas admissive portion 13 inflatable upon inflow of inflation gas G by separating a vehicle's inner wall 13a and an outer wall 13b, and a non-admissive portion 23 which is formed by joining the vehicle's inner wall 13a and the outer wall 13b and admits no inflation gas G.

Unlike the airbag 12B, however, the airbag 12C does not include a secondary chamber 57. The airbag 12C includes a single inflatable auxiliary chamber 52J that is continuous in the front-rear direction and located above three vertical chambers 17A, 17B and 17C, and a single inflatable auxiliary chamber 52K that is continuous in the front-rear direction and located above three vertical chambers 17F, 17G and 17H. The airbag 12C is further provided in the vicinity of the border of the gas feed passage 14 and the auxiliary chambers 52J and 52K with non-admissive portions 23 each of which includes a slit 62 cut through in inverted U shape. Each of the slits 62 defines a mounting portion 25.

Here in the airbag 12C, common members with the airbags 12 and 12B will be designated common reference numerals, and description thereof will be omitted. As the airbag 12, the airbag 12C is also bellows-folded on folds C, and then is mounted on a vehicle together with an unillustrated inflator 39 and unillustrated brackets 37 and 40 assembled with the airbag 12C.

Figure 25:
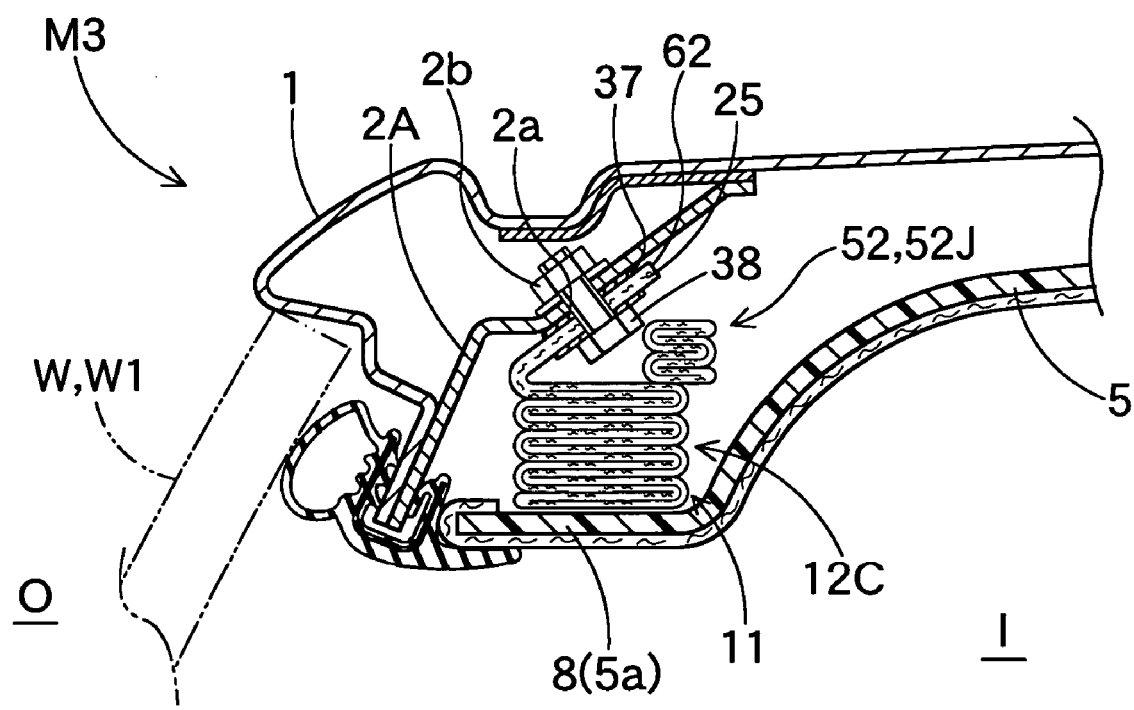
FIG. 25 is a partial enlarged vertical section of the airbag of FIG. 24 in a housed state, taken along line XXV-XXV in FIG. 24.
Figure 26:
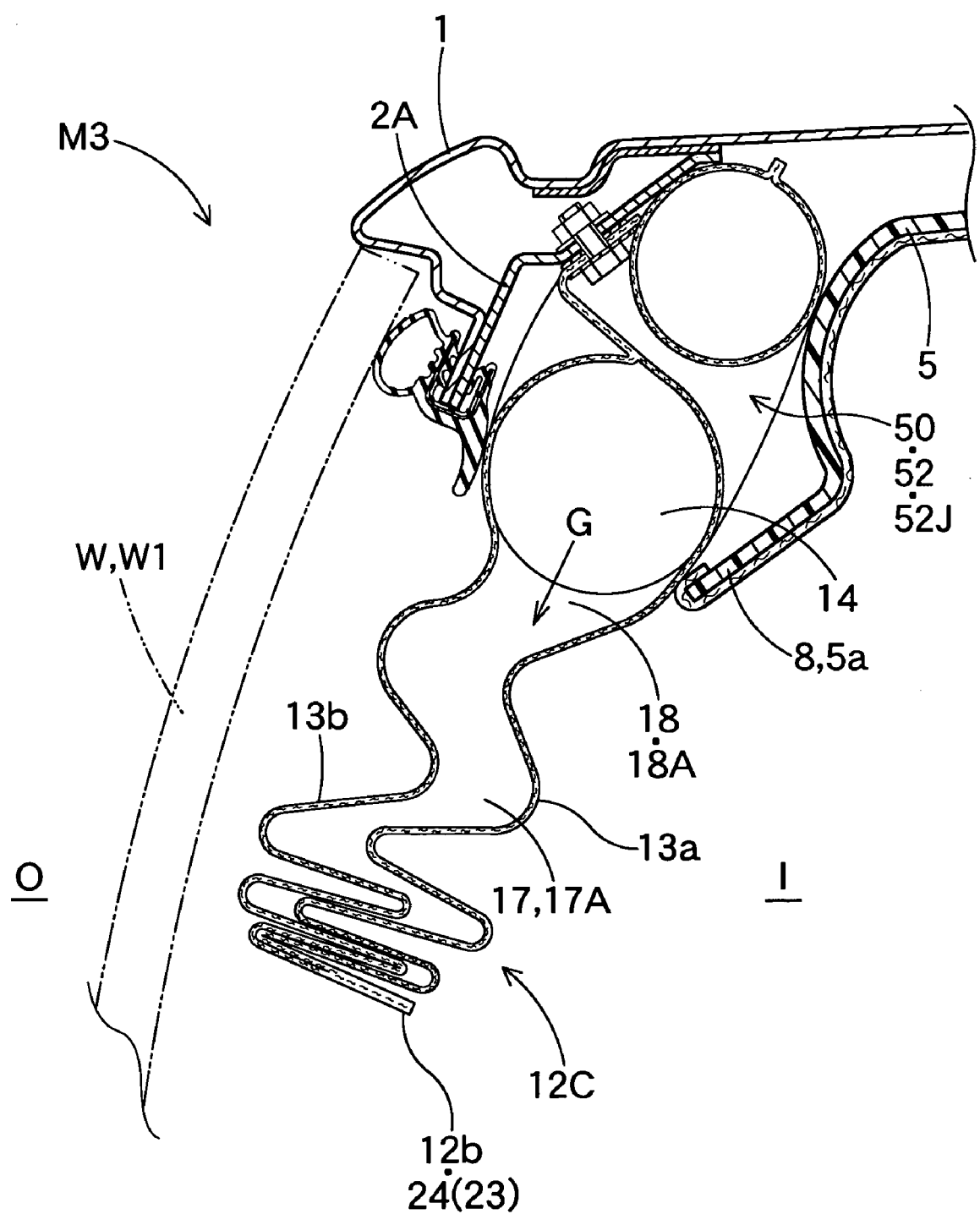
FIG. 26 is a partial enlarged vertical section of the airbag part shown in FIG. 25 being inflated.
Figure 27:
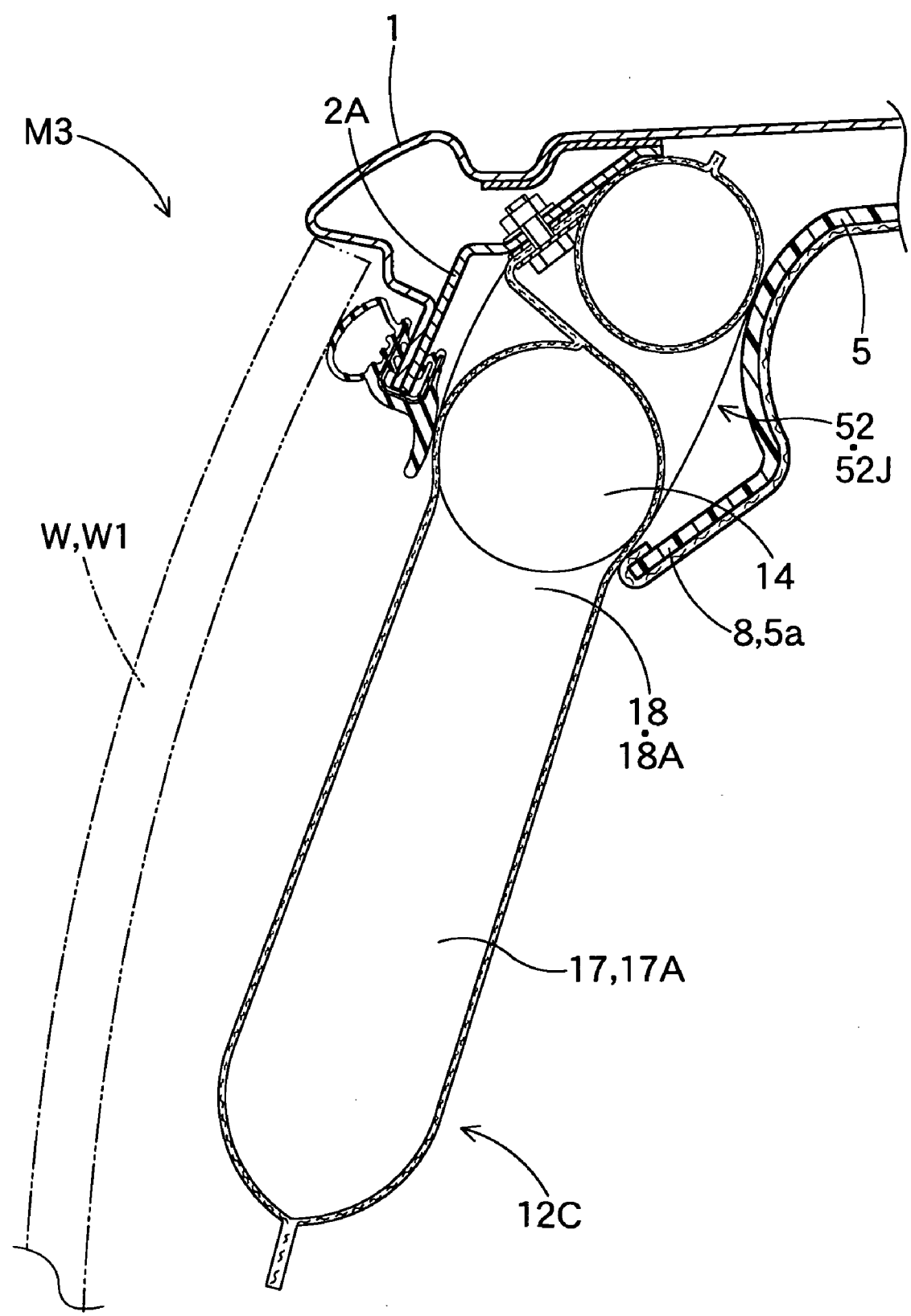
FIG. 27 is a partial enlarged vertical section of the airbag part shown in FIG. 26 completely inflated.
Figure 28:
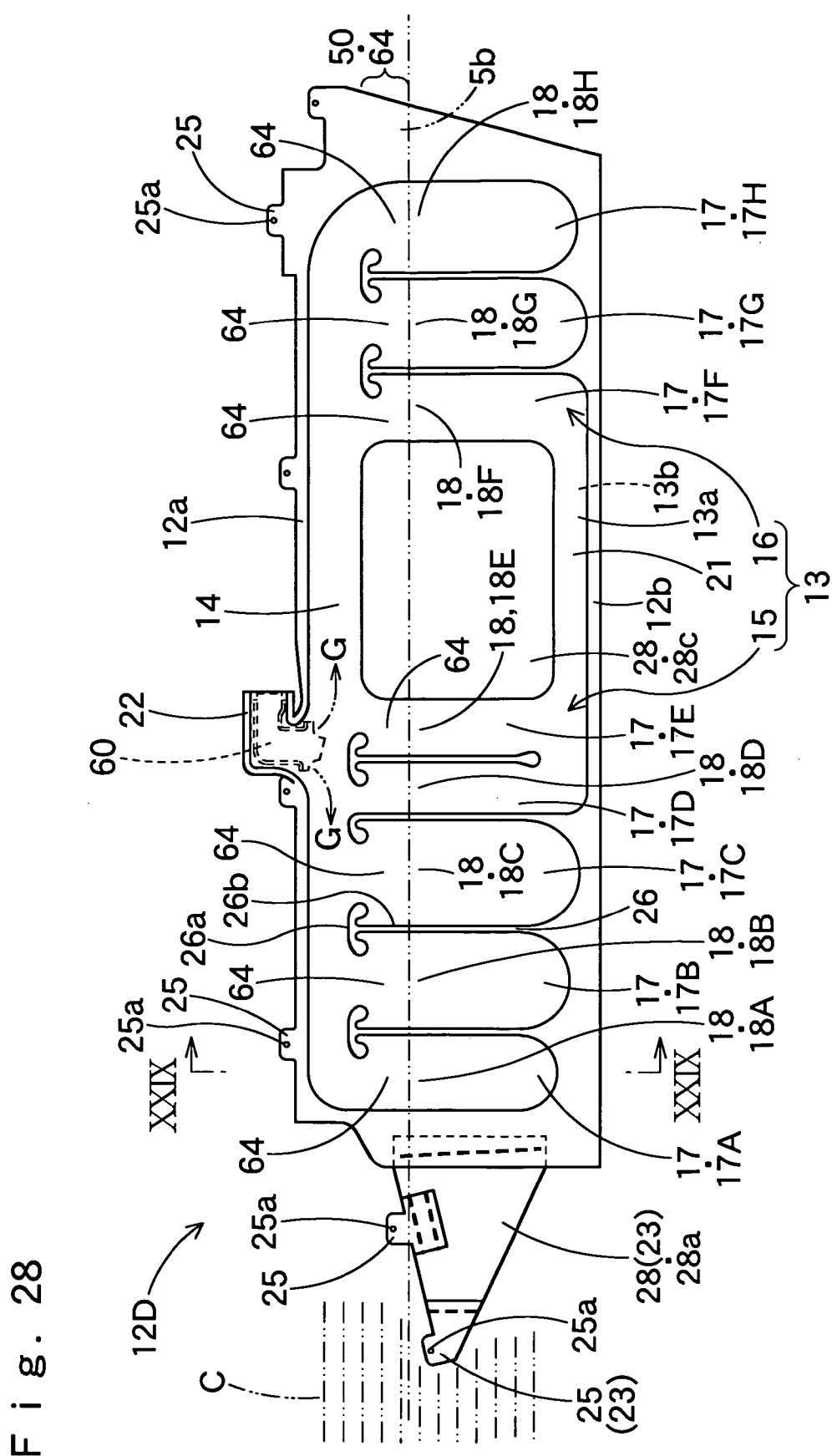
FIG. 28 is a front view of an airbag used in a fourth embodiment of the head-protecting airbag device as flatly expanded.

When inflation gas is discharged from the inflator 39, the airbag 12C of the head-protecting airbag device M3 inflates by admitting inflation gas G into the gas admissive portion 13, and then pushes and open an airbag cover 8 and deploys. When the auxiliary chambers 52 (52J and 52K) inflate together with the gas feed passage 14 in the initial stage of inflation of the airbag 12C, the gas feed passage 14 and the auxiliary chambers 52 are pushed by the airbag cover 8, and the auxiliary chambers 52 (52J and 52K) come to abut against the inner panel 2A as part of the vehicle body 1, as shown in FIGS. 25 and 26. At this time, since the inner panel 2A is slanted toward the vehicle's exterior O as it goes down, the auxiliary chambers 52 (52J and 52K) supported by the inner panel 2A direct their lower parts toward the exterior O. Then inflation gas G flowing into the vertical chambers 17 via the communication ports 18 from the gas feed passage 14 is directed down and toward the exterior O. As a result, as referred to FIG. 27, the vertical chambers 17 are pressed toward the window W while inflating, so that the same working-effects as in the second embodiment are obtained.

It will also be appreciated that the airbag is arranged as an airbag 12D in a fourth embodiment of the head-protecting airbag device M4 shown in FIGS. 28 to 31. As the airbag 12C, the airbag 12D is manufactured by hollow-weaving method utilizing polyamide yarns or the like, and includes a gas admissive portion 13 inflatable upon inflow of inflation gas G by separating a vehicle's inner wall 13a and an outer wall 13b, and a non-admissive portion 23 which is formed by joining the vehicle's inner wall 13a and the outer wall 13b and admits no inflation gas G. Unlike the airbag 12C, however, the airbag 12D does not include auxiliary chambers 52J and 52K as a gas flow regulating means 50, but includes a joining inflatable portion 64 as a gas flow regulating means 50 formed by increasing the capacity of a part below the gas feed passage 14 in the gas admissive portion 13.

More specifically, the airbag 12D is provided in the gas admissive portion 13 with a joining inflatable portion 64 that is located vertically between the gas feed passage 14 and the vertical chambers 17 as completely inflated, and inflates between the inner panel 2A as part of vehicle body 1 and the lower edge 5a of the roof head lining 5 as an airbag cover 8 for openably covering the vehicle's interior side I in the vicinity of the housing position 11 of the airbag 12D. This joining inflatable portion 64 constitutes the gas flow regulating means 50. As viewed from a different aspect, the airbag 12D can be described as having the individual vertical chambers 17 vertically elongated, such that the lower end 5b of the lower edge 5a of the head roof lining 5 as opened is located below the horizontal portions 26a of the partitioning portions 26, and as having the individual mounting portions 25 to be attached to the inner panel 2A located at higher positions than the airbags 12 and 12C.

In this airbag 12D, too, common members with the airbags 12 and 12C will be designated common reference numerals, and description thereof will be omitted. As the airbags 12 and 12C, the airbag 12D is also bellows-folded on folds C, and then is mounted on a vehicle together with an unillustrated inflator 39 and unillustrated brackets 37 and 40 assembled with the airbag 12D.

Figure 29:
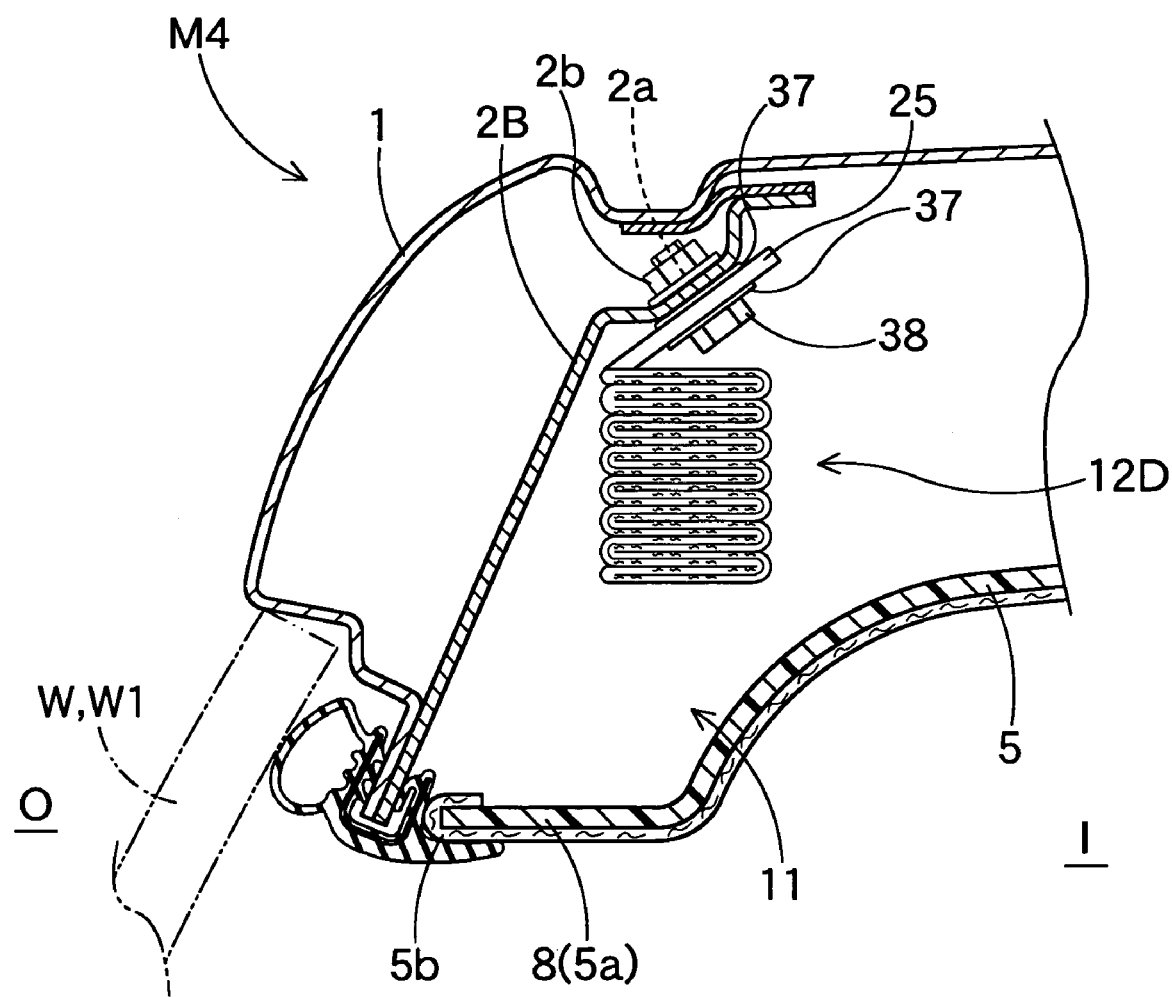
FIG. 29 is a partial enlarged vertical section of the airbag of FIG. 28 in a housed state, taken along line XXIX-XXIX in FIG. 28.
Figure 30:
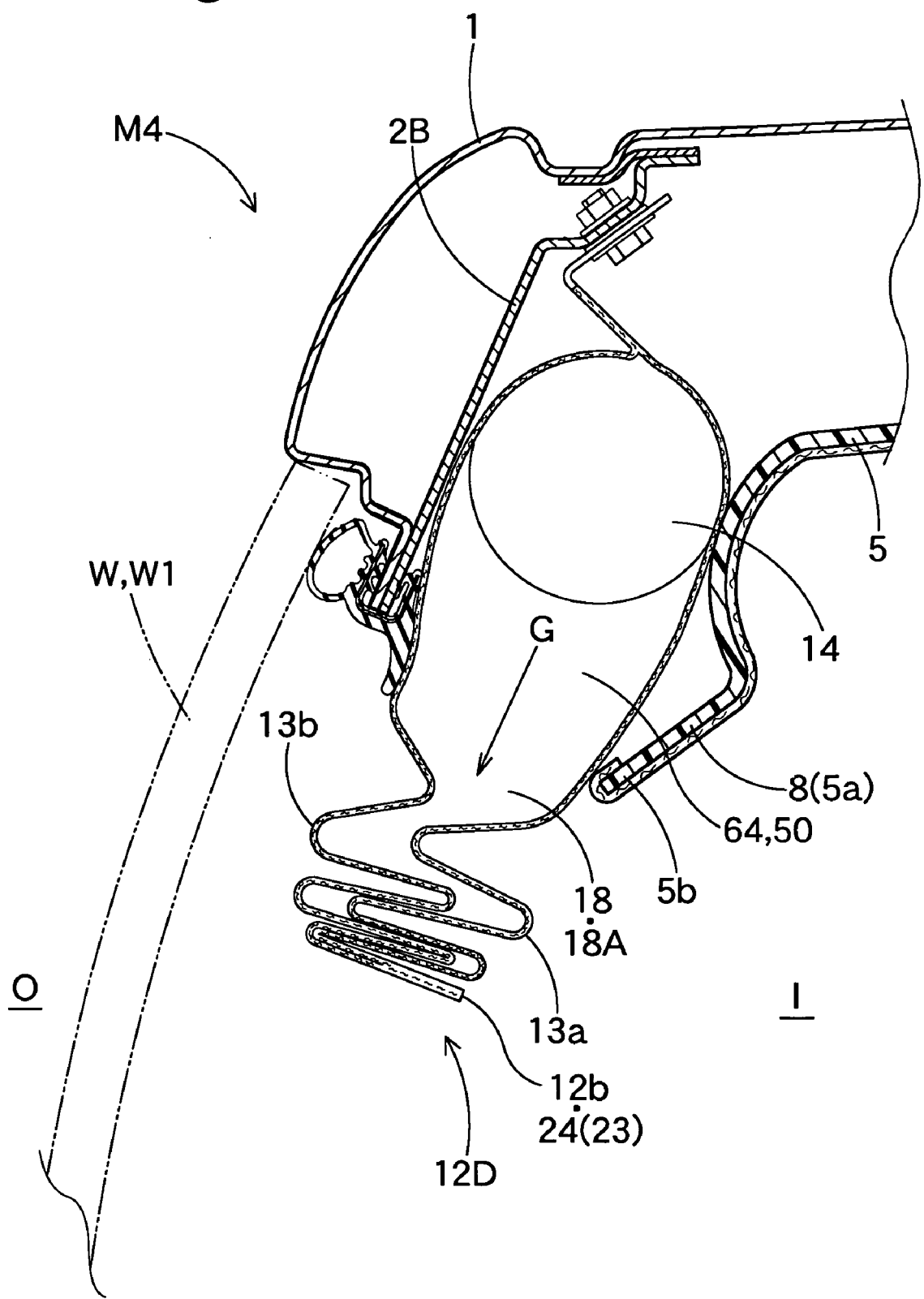
FIG. 30 is a partial enlarged vertical section of the airbag part shown in FIG. 29 being inflated.
Figure 31:
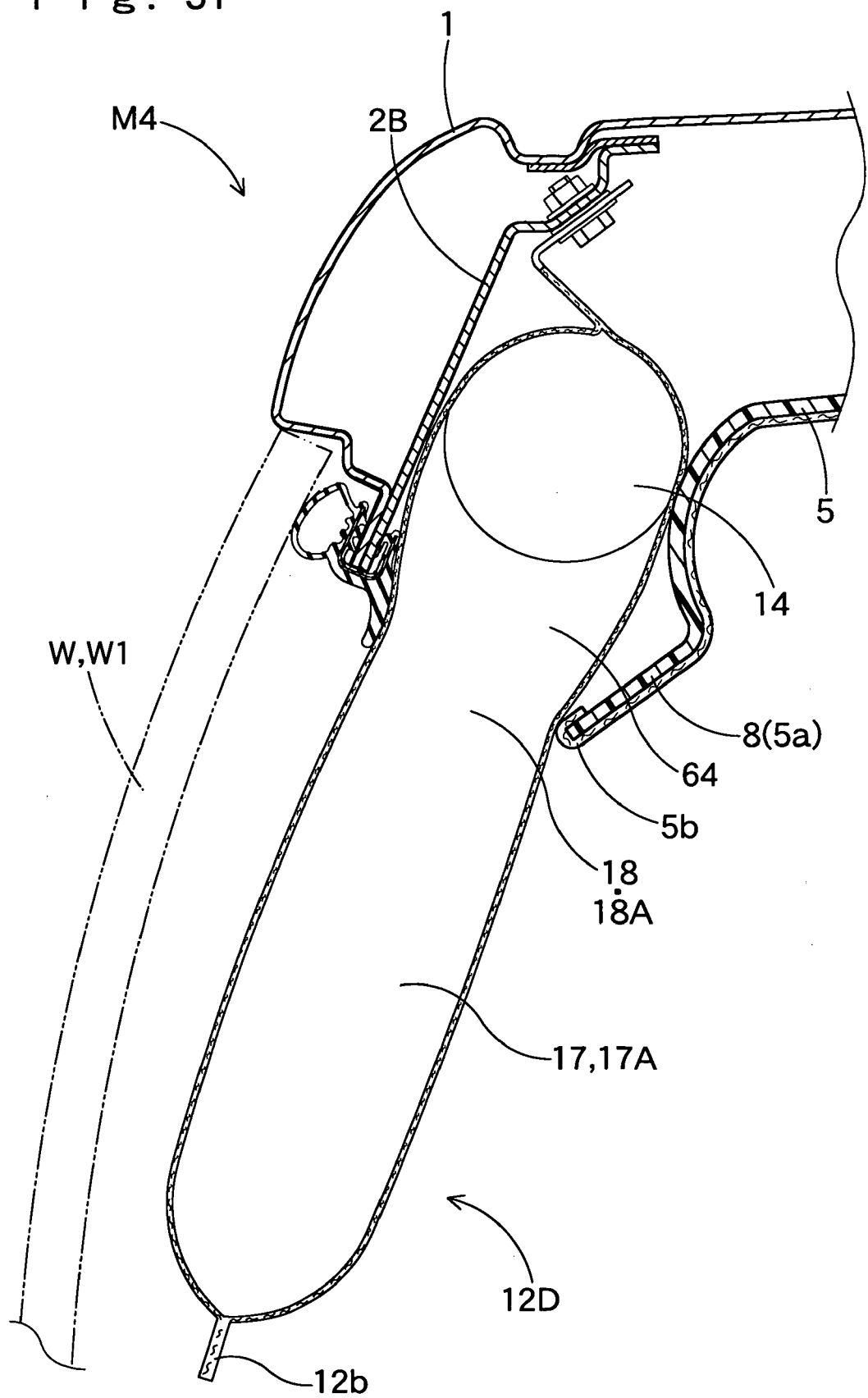
FIG. 31 is a partial enlarged vertical section of the airbag part shown in FIG. 30 completely inflated.
Figure 32:
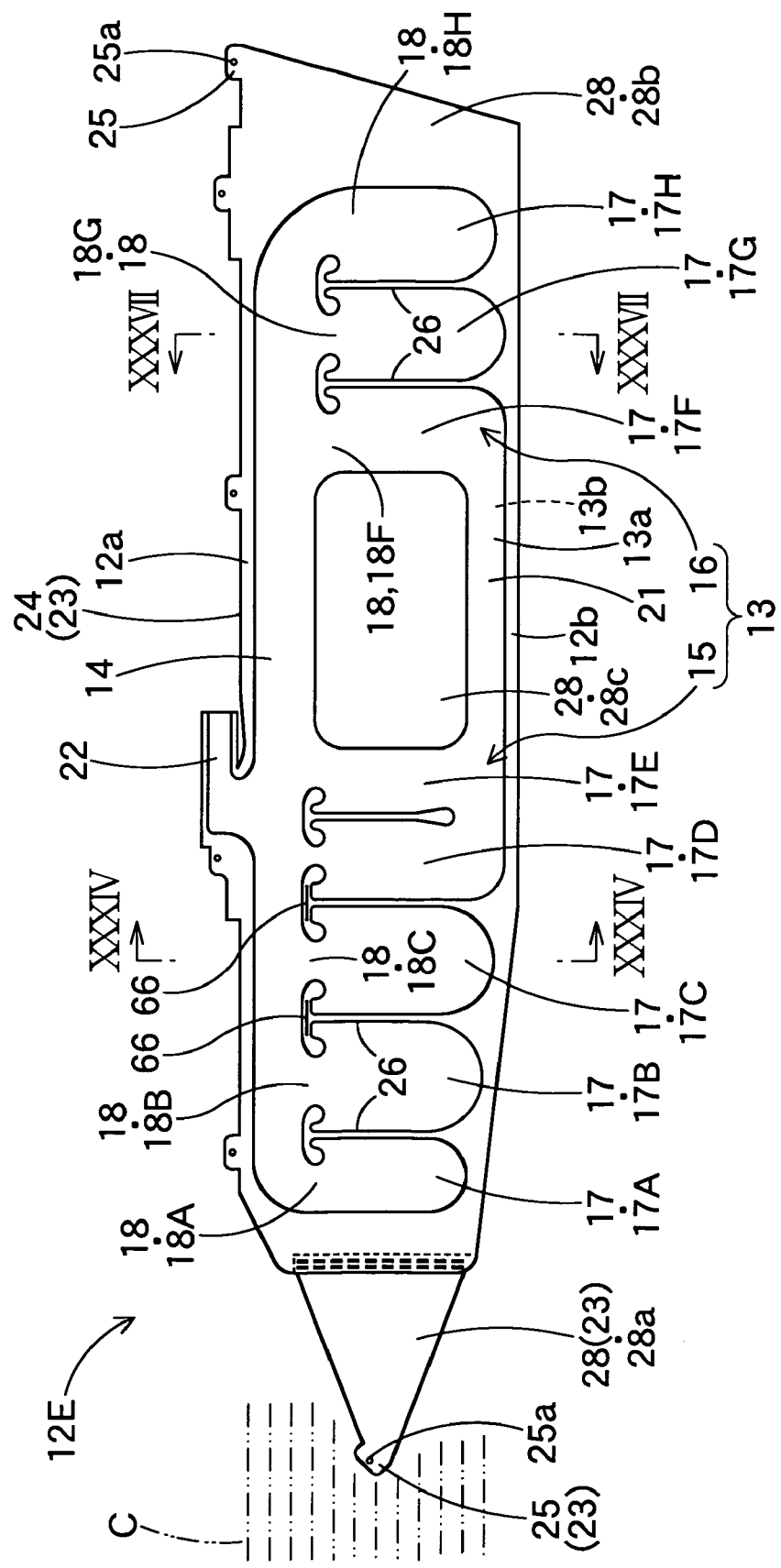
FIG. 32 is a front view of an airbag used in a fifth embodiment of the head-protecting airbag device as flatly expanded.
Figure 33:
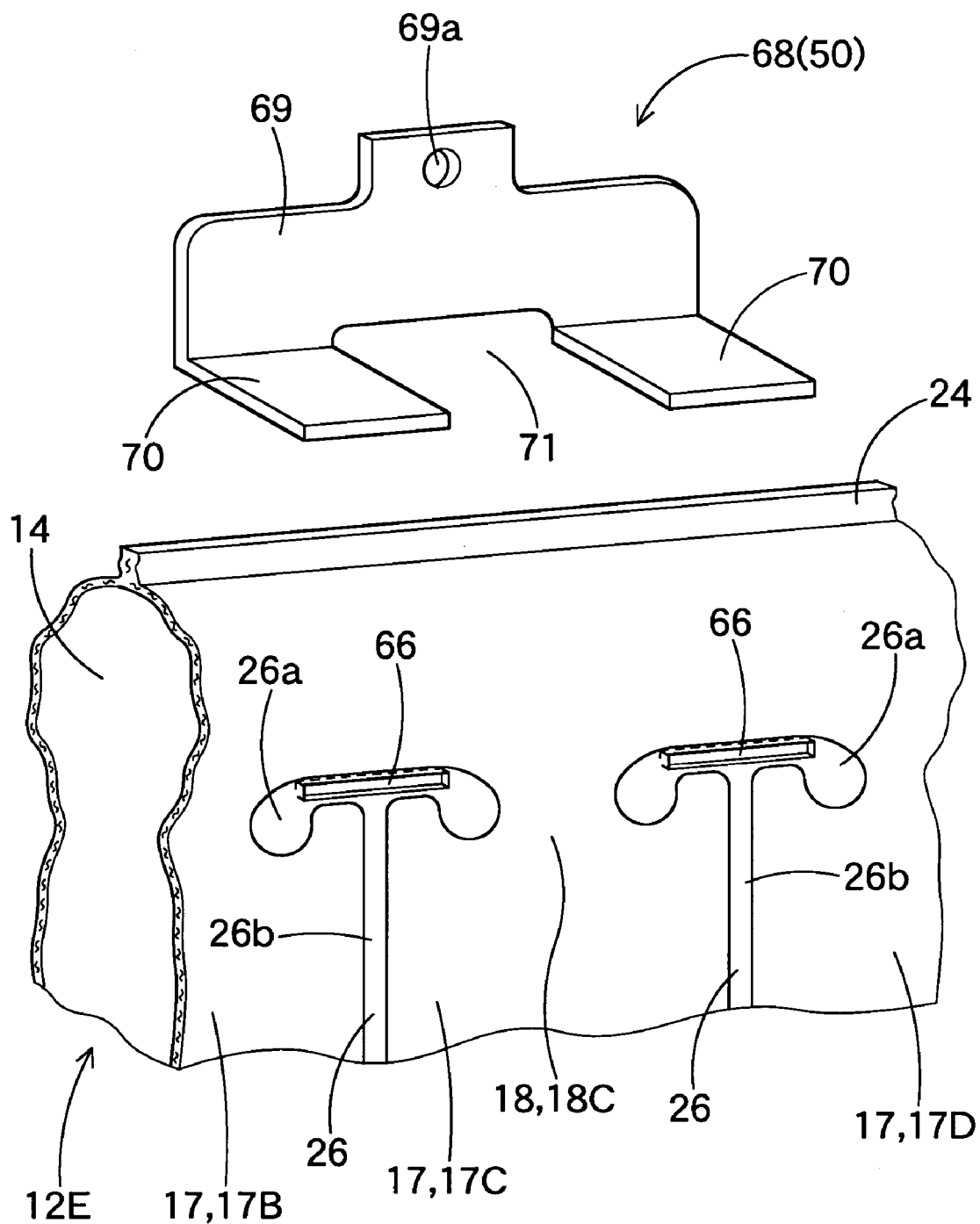
FIG. 33 is a partial perspective view of a holder that constitutes a gas flow regulating means and an airbag in the fifth embodiment.

When inflated, in the head-protecting airbag device M4, the joining inflatable portion 64 carries out the function of the auxiliary chambers 52 in the airbags 12B and 12C. More specifically, if the joining inflatable portion 64 inflates together with the gas feed passage 14 in the initial stage of inflation of the airbag 12D, the gas feed passage 14 and the joining inflatable portion 64 are pushed by the airbag cover 8, and the joining inflatable portion 64 comes to abut against and supported by the inner panel 2B as part of the vehicle body 1, as shown in FIGS. 29 and 30. At this time, since the inner panel 2B is slanted toward the vehicle's exterior O as it goes down, the joining inflatable portion 64 supported by the inner panel 2B directs its lower part toward the exterior O. Then inflation gas G flowing into the vertical chambers 17 via the communication ports 18 from the gas feed passage 14 is directed down and toward the exterior O. As a result, as referred to FIG. 31, the vertical chambers 17 are pressed toward the window W while inflating.

This arrangement dispenses with a separate member conventionally located in a pillar portion by merely locating the joining inflatable portion 64 in the gas admissive portion 13 of the airbag 12D. Therefore, the airbag device M4 is made compact, and workability is improved in the mounting work on the vehicle.

Here in the airbag 12D, the joining inflatable portion 64 is located above all the vertical chambers 17. However, the airbag may be arranged such that the joining inflatable portion 64 is located above only one or predetermined vertical chambers 17 by lowering the location of the horizontal portions 26a of predetermined partitioning portions 26, or by closing an upper part of predetermined vertical chamber 17 and discommunicating the vertical chamber 17 and the gas feed passage 14.

Furthermore, it will also be appreciated that the airbag device is arranged as a fifth embodiment of the head-protecting airbag device M5 shown in FIGS. 32 to 39. This airbag device M5 includes two kinds of gas flow regulating means 50 (68 and 80). A first gas flow regulating means 68 is a holder 68 that is located proximate to the housing position 11 of the airbag 12E for holding and fixing the periphery of a communication port 18 of at least one vertical chamber 17 upon airbag deployment. A second gas flow regulating means 80 is constituted by a regulating portion 80 located in the lower edge 75a of a roof head lining 75 as an airbag cover 8 in the vicinity of the housing position 11 of the airbag 12E.

As the airbag 12, the airbag 12E is manufactured by hollow-weaving method utilizing polyamide yarns or the like, and includes a gas admissive portion 13 inflatable upon inflow of inflation gas G by separating a vehicle's inner wall 13a and an outer wall 13b, and a non-admissive portion 23 which is formed by joining the vehicle's inner wall 13a and the outer wall 13b and admits no inflation gas G. Unlike the airbag 12, however, the airbag 12E includes slits 66 for inserting projected portions 70 of the holders 68 as a gas flow regulating means 50 therethrough. The slits 66 are cut through in horizontal portions 26a of the both partitioning portions 26 located front and rearwards of the vertical chamber 17C.

In this airbag 12E, too, common members with the airbag 12 will be designated common reference numerals, and description thereof will be omitted. As the airbag 12, the airbag 12E is also bellows-folded on folds C, and then is mounted on a vehicle together with an unillustrated inflator 39 and unillustrated brackets 37 and 40 assembled with the airbag 12E. However, when mounted on vehicle, the airbag 12E is also assembled together with the holder 68, and mounted on vehicle together with the holder 68.

The holder 68 is made of sheet metal to have a substantially L-shaped section, and includes a fixing portion 69 to be secured to the inner panel 2 by a bolt 73, and two projected portions 70 projected from the fixing portion 69 toward the vehicle's interior I. Between the projected portions 70 is a recessed portion 71 whose dimension corresponds to a clearance between the slits 66 of the airbag 12E as completely inflated, or whose dimension substantially equals to the outer diameter of the periphery of the communication port 18C of the vertical chamber 17C as completely inflated. The fixing portion 69 is provided with a fixing hole 69a for inserting the bolt 73 for bolt-fixing of the holder 68 therethrough. The bolt 73 is fastened into a nut 2b located in a mounting hole 2a of the inner panel 2.

The holder 68 is predetermined so that, when the projected portions 70 are inserted into the slits 66 and the fixing portion 69 is secured to vehicle, inflation gas G flowing into the vertical chamber 17C via the communication port 18C from the gas feed passage 14 is directed down and toward the exterior O. In other words, the holder 68 is so predetermined that, as attached to vehicle, the thickness direction of the projected portions 70 and the axial direction X1 of an opening plane 72 of the recessed portion 71 located between the projected portions 70 are directed along the window W, or toward the vehicle's exterior O as going down.

On the other hand, a part 80 of the roof head lining 75 is constructed to open less toward the vehicle's interior I than the remaining part 79 so that one vertical chamber 17G is pressed toward the exterior O during deployment. More specifically, the roof head lining 75 includes a body portion 76 made of synthetic resin such as polypropylene, and a surface skin 78 made of fabric or the like and adhered to the vehicle's interior side I of the body portion 76. Furthermore, an insert 77 is embedded in the body portion 76 in the vicinity of the vertical chamber 17G. The part where the insert 77 is embedded serves as the regulating portion 80. The lower end 80a of the part 80 is suppressed relative to the opening width toward the vehicle's interior I upon protrusion of the airbag 12E than the lower ends 79a of the remaining part 79 where no insert 77 is embedded.

Figure 34:
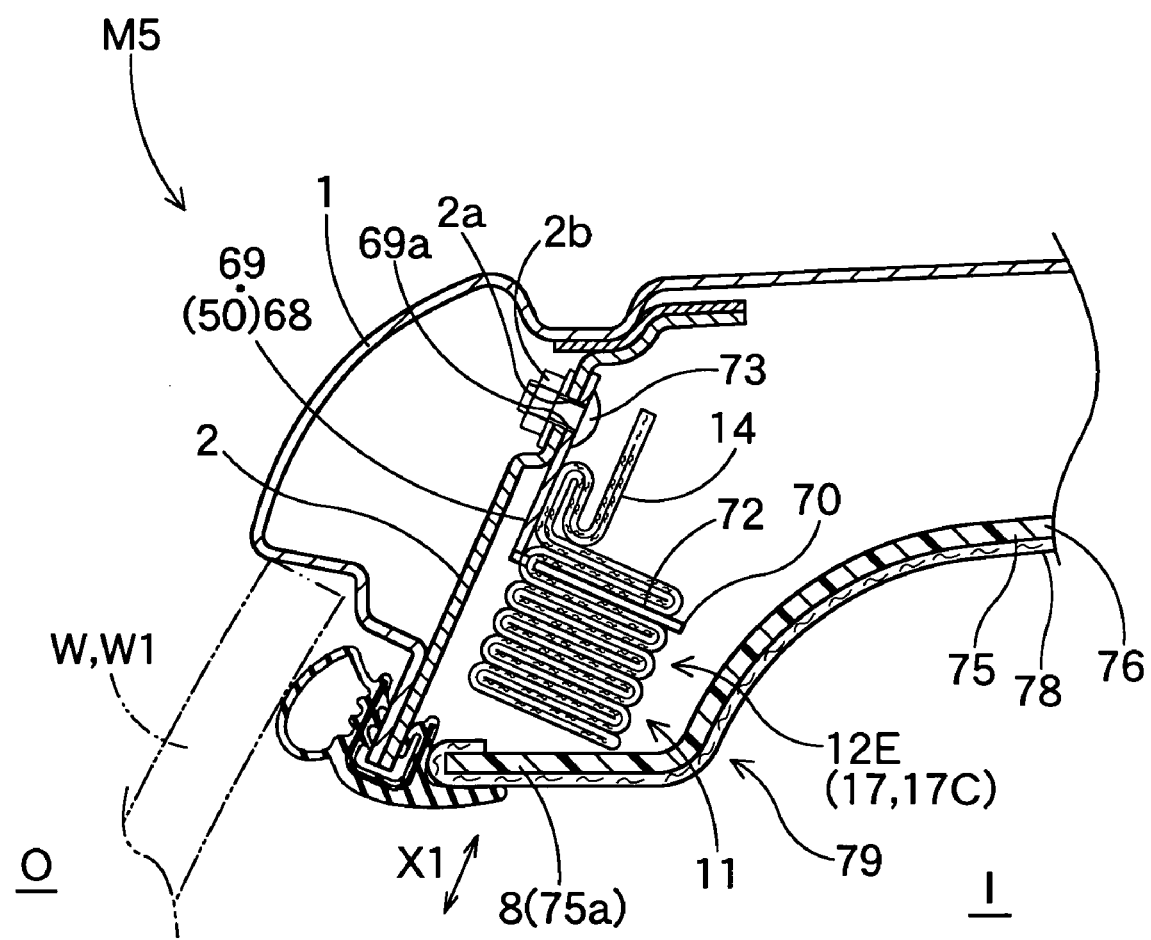
FIG. 34 is a partial enlarged vertical section of the airbag of FIG. 32 in a housed state, taken along line XXXIV-XXXIV in FIG. 32.
Figure 35:
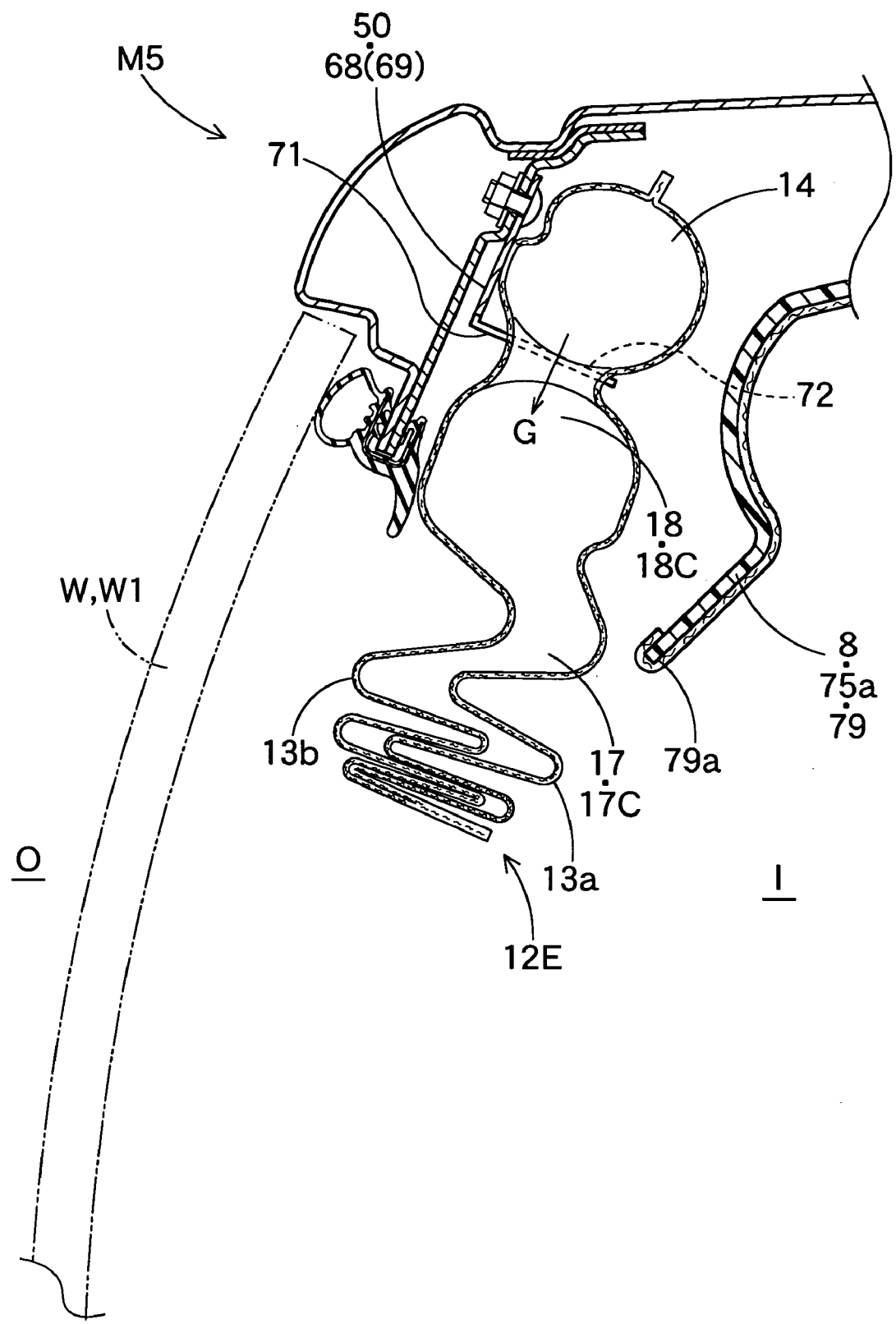
FIG. 35 is a partial enlarged vertical section of the airbag part shown in FIG. 34 being inflated.
Figure 36:
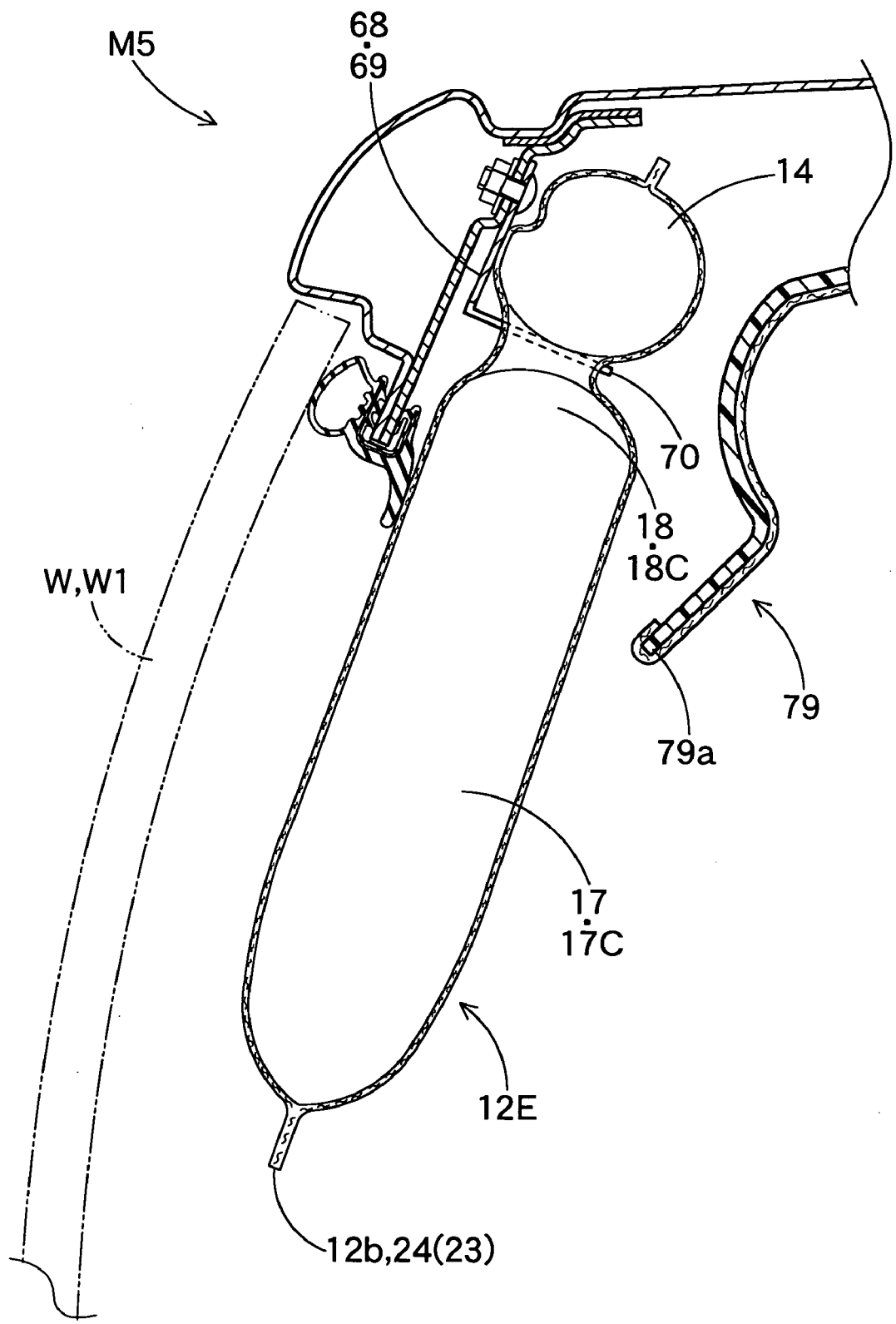
FIG. 36 is a partial enlarged vertical section of the airbag part shown in FIG. 35 completely inflated.
Figure 37:
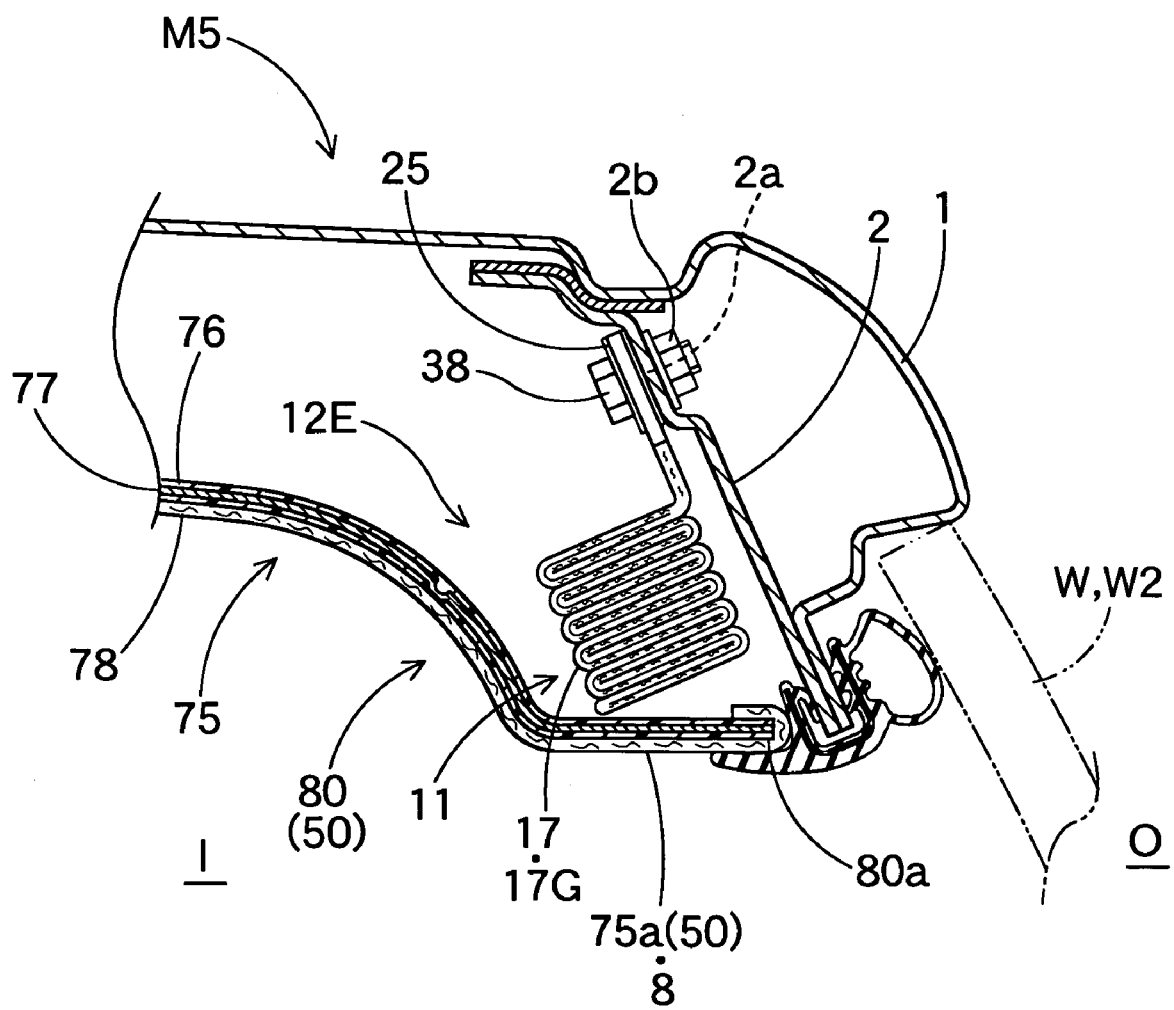
FIG. 37 is a partial enlarged vertical section of the airbag of FIG. 32 in a housed state, taken along line XXVII-XXVII in FIG. 32.
Figure 38:
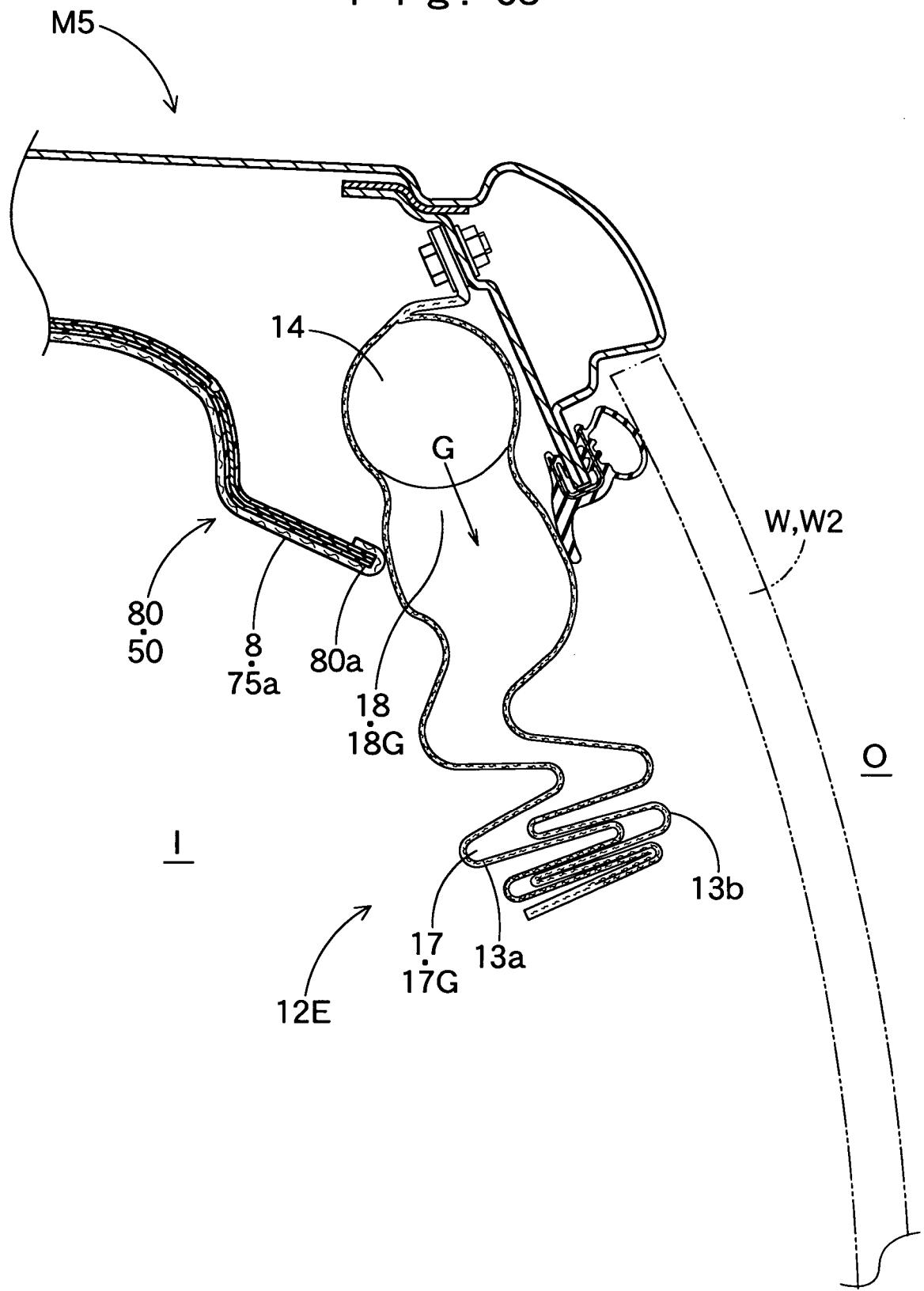
FIG. 38 is a partial enlarged vertical section of the airbag part shown in FIG. 37 being inflated.
Figure 39:
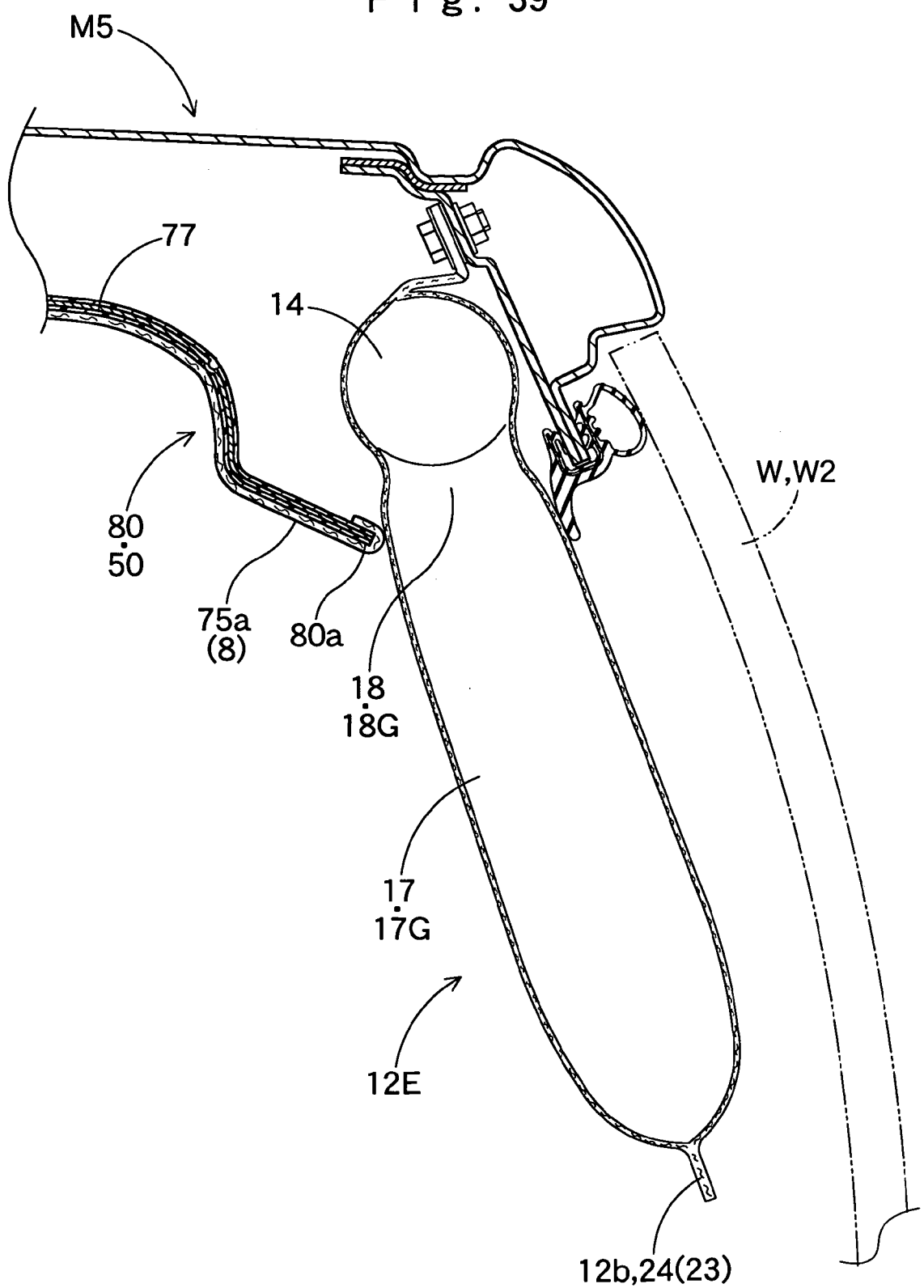
FIG. 39 is a partial enlarged vertical section of the airbag part shown in FIG. 38 completely inflated.

In the head-protecting airbag device M5 in the fifth embodiment, when an unillustrated inflator 39 is actuated and inflation gas G flows into the individual vertical chambers 17 from the joint port 22 and through the gas feed passage 14 of the gas admissive portion 13, inflation gas G flowing into the vertical chamber 17C is directed down and toward the exterior O securely, as referred to FIGS. 34 to 36, since the holder 68 holds the periphery of the communication port 18C. Consequently, the airbag 12E is able to deploy the vertical chamber 17C along the window W easily by the holder 68, and the airbag 12E around the vertical chamber 17c deploys along the window W as well. The holder 68 has only to be located proximate to the communication port 18C of the housed vertical chamber 17B, unlike a vertically elongate predetermined member conventionally located in a pillar portion. Therefore, the airbag device M5 is made compact, and the workability is improved in mounting the airbag device on vehicle.

In the airbag device M5, moreover, upon deployment of the airbag 12E, the regulating portion 80 of the roof head lining 75 as an airbag cover 8 presses the vertical chamber 17G toward the exterior O. Accordingly, the communication port 18G of the vertical chamber 17G is directed down and toward the exterior O, and thus the vertical chamber 17G deploys along the window W. This arrangement can be made easily by merely enhancing the rigidity of a part 80 of the airbag cover 75, without changing the construction of the rear admissive portion 16 itself of the airbag 12E. That is, the airbag device M5 dispenses with a member which was conventionally located in a pillar portion, and is constructed compactly. In addition, the airbag device M5 is constructed easily by merely changing the design of the airbag cover 75, which is a conventional part of the airbag device, so that the airbag device M5 does not increase the number of parts mounted on the vehicle. Accordingly, the workability is improved in mounting the airbag device on vehicle. With this arrangement, of course, it is prevented to the utmost that deployment of the entire airbag 12E is delayed, since the airbag cover 75 is not rigidified entirely.

The foregoing embodiment shows the holder 68 which holds the periphery of the communication port 18C of one vertical chamber 17C. However, it will also be appreciated that one holder holds the peripheries of communication ports 18 of a plurality of vertical chambers 17. Alternatively, the peripheries of a plurality of communication ports 18 may be held by a plurality of holders.

Although the roof head lining 75 of the fifth embodiment is constructed to press only one vertical chamber 17G, the roof head lining 75 may be so constructed as to press a plurality of inflating vertical chambers 17 toward the exterior O.

Although the airbag device M5 of the fifth embodiment includes two gas flow regulating means 68 and 80, the airbag device M5 may employ only either one of the means 68 or 80.

Moreover, the head-protecting airbag device may employ more than one gas flow regulating means together out of the means 50 (31, 33, 52, 64, 68 and 80) described in the first to fifth embodiments.

What is claimed is:

1. A head-protecting airbag device for a vehicle comprising an airbag folded and housed in the upper edge of windows inside a vehicle, and deployable downward along the windows when fed with inflation gas, wherein:

the airbag includes:
 a gas admissive portion, which is inflatable with inflation gas by separating an inner wall and an outer wall of the airbag; and
 a non-admissive portion, which is formed by joining the inner wall and outer wall and admits no inflation gas;

the gas admissive portion includes:
 a gas feed passage extending along the upper edge of the airbag as flatly expanded for feeding inflation gas along front-rear direction; and
 a plurality of vertical chambers juxtaposed along the front-rear direction of the vehicle, each of the vertical chambers being provided at upper end thereof with a communication port for communicating with the gas feed passage; and a gas flow regulating means is located in at least one of the vertical chambers, the regulating means being constituted by part of the airbag itself, whereby, when inflation gas flows into the vertical chamber via the communication port, the inflation gas is directed obliquely down and toward the vehicle's exterior, wherein:

substantial length of the inner wall and substantial length of the inner wall are differentiated from each other in the gas feed passage in the periphery of the communication port of the at least one vertical chamber; and the difference lengths of the outer and inner walls constitutes the gas flow regulating means.

2. The head-protecting airbag device according to claim 1, wherein:

the airbag includes a flexible belt in an exterior side thereof, the belt being joined to the vicinity of the at least one vertical chamber and to a vehicle body in the vicinity of a housing position of the airbag, whereby the vertical chamber, when inflated, is pressed toward the window; and the belt constitutes the gas flow regulating means.

3. A head-protecting airbag device for a vehicle comprising an airbag folded and housed in the upper edge of windows inside a vehicle, and deployable downward along the windows when fed with inflation gas, wherein:

the airbag includes:
 a gas admissive portion, which is inflatable with inflation gas by separating an inner wall and an outer wall of to airbag; and
 a non-admissive portion, which is formed by joining the inner wall and outer wall and admits no inflation gas;

the gas admissive portion includes:
  a gas feed passage extending along the upper edge of the airbag as flatly expanded for feeding inflation gas along front-rear direction; and
  a plurality of vertical chambers juxtaposed along the front-rear direction of the vehicle, each of the vertical chambers being provided at upper end thereof with a communication port for communicating with the gas feed passage; and
a gas flow regulating means is located in at least one of the vertical chambers, the regulating means being constituted by part of the airbag itself, whereby, when inflation gas flows into the vertical chamber via the communication port, the inflation gas is directed obliquely down and toward the vehicle's exterior.
wherein the gas admissive portion includes an auxiliary chamber located above the gas feed passage for, upon airbag deployment, inflating between a panel as part of the vehicle body and an airbag cover in the vicinity of the housing position of the airbag, the airbag cover being openably covering an airbag side toward the vehicle's interior.
wherein the auxiliary chamber constitutes the gas flow regulating means,
wherein the auxiliary chamber is located in plurality, respectively above predetermined numbers of the vertical chamber,
wherein the opening dimension of each of the auxiliary chambers in the front-rear direction and the opening dimension of the communication port located below the auxiliary chamber in the front-rear direction are equal to each other.

4. The head-protecting airbag device according to claim 3, wherein the airbag includes a mounting portion for attachment to the panel of vehicle body, the mounting portion being located, when the airbag is completely inflated, below the upper end of the auxiliary chamber and above the vertical chamber.

5. A head-protecting airbag device for a vehicle comprising an airbag folded and housed in the upper edge of windows inside a vehicle, and deployable downward along the windows when fed with inflation gas, wherein:
  the airbag includes:
    a gas admissive portion, which is inflatable with inflation gas by separating an inner wall and an outer wall of the airbag; and
    a non-admissive portion, which is formed by joining the inner wall and outer wall and admits no inflation gas;
  the gas admissive portion includes:
    a gas feed passage extending along the upper edge of the airbag as flatly expanded for feeding inflation gas along front-rear direction; and
    a plurality of vertical chambers juxtaposed along the front-rear direction of the vehicle, each of the vertical chambers being provided at upper end thereof with a communication port for communicating with the gas feed passage;
  a gas flow regulating means for redirecting the inflation gas flowing into at least one of the vertical chambers, obliquely down and toward the vehicle's exterior via the communication port;
  a holder located proximate to the housing position of the airbag for holding and fixing the periphery of the communication port of the at least one of the vertical chambers upon airbag deployment; and
  the holder constitutes the gas flow regulating means,
  the holder is made of sheet metal and has a substantially L-shaped section including a fixing portion secured to an inner panel of a vehicle body and two projected portions having a recessed portion between themselves,
  the airbag includes slits at front and rear periphery of the communication port for receiving the projected portions of the holder, and
  when the airbag device is mounted on the vehicle, the axial direction of an opening plane of the recessed portion disposed between the projected portions is directed downward and toward the vehicle's exterior.

* * * * *